United States Patent
Zhu et al.

(10) Patent No.: US 8,370,427 B2
(45) Date of Patent: Feb. 5, 2013

(54) METHOD AND APPARATUS FOR TRANSMITTING MESSAGES BETWEEN HETEROGENEOUS NETWORKS

(75) Inventors: Ake Zhu, Shenzhen (CN); Riming Zhou, Shenzhen (CN); Yanfeng Gao, Shenzhen (CN); Wenyong Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 12/764,283

(22) Filed: Apr. 21, 2010

(65) Prior Publication Data

US 2010/0205268 A1 Aug. 12, 2010

Related U.S. Application Data

(63) Continuation of application No. PCT/CN2008/072781, filed on Oct. 22, 2008.

(30) Foreign Application Priority Data

Oct. 22, 2007 (CN) .......................... 2007 1 0163429

(51) Int. Cl.
*G06F 15/16* (2006.01)
(52) U.S. Cl. .................... 709/203; 709/220; 370/352
(58) Field of Classification Search .................. 709/203, 709/220, 224; 455/372; 370/352
See application file for complete search history.

(56) References Cited

U.S. PATENT DOCUMENTS

| | | | | |
|---|---|---|---|---|
| 7,359,373 | B2 * | 4/2008 | Kuusinen et al. | 370/352 |
| 8,015,293 | B2 * | 9/2011 | Schaedler et al. | 709/227 |
| 8,102,839 | B2 * | 1/2012 | Kuusinen et al. | 370/352 |
| 2005/0210394 | A1 * | 9/2005 | Crandall et al. | 715/752 |
| 2007/0177602 | A1 * | 8/2007 | Pichelin et al. | 370/395.2 |
| 2008/0014998 | A1 * | 1/2008 | Choi | 455/572 |
| 2009/0070469 | A1 * | 3/2009 | Roach et al. | 709/226 |
| 2010/0205662 | A1 * | 8/2010 | Ibrahim et al. | 726/7 |

FOREIGN PATENT DOCUMENTS

| | | | |
|---|---|---|---|
| CN | 1855892 | A | 11/2006 |
| CN | 1878343 | A | 12/2006 |
| CN | 1897578 | A | 1/2007 |
| CN | 1929457 | A | 3/2007 |
| CN | 1929458 | A | 3/2007 |
| EP | 1732277 | A1 | 12/2006 |
| WO | 2006126959 | A2 | 11/2006 |
| WO | 2007006235 | A1 | 1/2007 |
| WO | 2007064943 | A2 | 6/2007 |
| WO | 2007075213 | A1 | 7/2007 |

OTHER PUBLICATIONS

Written Opinion of corresponding International Patent Application No. PCT/CN2008/072781, mailed on Feb. 5, 2009, 5 pages total.
Supplementary Search Report of corresponding European Patent Application No. 08845742.9, mailed on Jun. 1, 2010, 6 pages total.
Cover page of corresponding granted Chinese Patent No. 101420657B (Application No. 200710163429.2), issued on Jan. 5, 2011, 1 page only.

(Continued)

*Primary Examiner* — Khanh Dinh

(57) ABSTRACT

A method and apparatus for transmitting messages between heterogeneous networks are disclosed. The method includes: receiving an IP multimedia subsystem (IMS) message from an IMS network; converting the format of the IMS message into the format of a non-IMS message and converting the sender terminal ID of the IMS message into the sender terminal ID of the non-IMS message; and sending the non-IMS message that includes the content and sender terminal ID of the non-IMS message to a receiver terminal of the non-IMS message through the home network of the non-IMS message. The disclosure can implement message interworking between an IMS user terminal and a non-IMS user terminal.

9 Claims, 15 Drawing Sheets

OTHER PUBLICATIONS

Huawei, Change Request 23.804 CR 0003, Version 7: "Dealing with the difference between existing SMS and SMS over IP," 3GPP TSG SA WG2 Architecture—S2#47, S-051726, Montreal, Canada, Jun. 27-Jul. 1, 2005, 8 pages total.

Foreign Communication From a Related Counterpart Application—International Search Report, PCT/CN2008/072781, Feb. 5, 2009, 4 pages.
Foreign Communication From a Related Counterpart Application—Chinese Office Action, CN2007101634292, Sep. 25, 2009, 5 pages.

* cited by examiner

METHOD AND APPARATUS FOR TRANSMITTING MESSAGES BETWEEN HETEROGENEOUS NETWORKS

CROSS-REFERENCE TO RELATED APPLICATIONS

This application is a continuation of International Application No. PCT/CN2008/072781, filed on Oct. 22, 2008, which claims priority to Chinese Patent Application No. 200710163429.2, filed on Oct. 22, 2007, both of which are hereby incorporated by reference in their entireties.

FIELD OF THE INVENTION

The disclosure relates to wireless communications, and in particular, to a method for transmitting messages between heterogeneous networks and a message conversion apparatus.

BACKGROUND OF THE INVENTION

An IP multimedia subsystem (IMS) network is a telecom network designed for convenient and flexible provision of services. IMS messaging services is a kind of messaging service based on the IMS network, and can transmit texts and attachments. An IMS message is transmitted as follows: The IMS message is sent from a sender terminal, and routed to the messaging application server (AS) of the sender terminal through a core network; the messaging AS corresponding to the sender terminal transmits the IMS message according to the service fields in the IMS message and stored user information in the messaging AS; the core network routes the IMS message to the home messaging AS corresponding to the receiver terminal according to the designation address of the IMS message; and the home messaging AS corresponding to the receiver terminal triggers the service, discards the message or delivers the message to the receiver terminal according to the user information of the receiver terminal.

Short message service (SMS) is one of popular services on second generation (2G) networks, with a large number of user resources. The SMS is based on the public land mobile network (PLMN), and can transmit texts. A short message is transmitted as follows: The short message is sent from the sender terminal, and routed to the SMS center through the packet-switched (PS) domain; the SMS center sends the short message to the receiver terminal according to the receiver terminal number. If the receiver terminal is in other systems, the SMS center sends the short message to a short message gateway (SMG). Then, the SMG routes the short message to SMS centers in the other systems, which send the short message to the receiver terminal.

Multimedia message service (MMS) is one of popular services on second-and-a-half generation (2.5G) networks, with a large number of user resources. The MMS is based on the PLMN, and can transmit texts and attachments. A multimedia message is transmitted as follows: The multimedia message is sent from the sender terminal, and routed to the home MMS center of the sender terminal; the home MMS center corresponding to the sender terminal sends the multimedia message to the home MMS center corresponding to the receiver terminal according to the receiver terminal number; the home MMS center of the receiver terminal sends the multimedia message to the receiver terminal according to the receiver terminal number.

During the implementation of the disclosure, the inventor finds that the conventional art has at least the following problem:

Because the 2G and 2.5G PLMN networks adopt a network protocol is different from the network protocol of the IMS system, the interworking between messages of IMS users and SMS users or between messages of IMS users and MMS users needs to be solved in the initial phase of IMS messaging service. However, the conventional art does not provide a specific solution to this problem.

SUMMARY OF THE INVENTION

Embodiments of the disclosure provide a method and apparatus for transmitting messages between heterogeneous networks to implement interworking between messages on an IMS network and messages on a non-IMS network.

A method for transmitting messages between heterogeneous networks is provided in an embodiment of the disclosure. The method includes the following steps:

receiving an IMS message from an IMS network;

converting the content format of the IMS message into the content format of a non-IMS message, and converting the sender terminal ID of the IMS message into the sender terminal ID of a non-IMS message; and sending the non-IMS message that includes the non-IMS message content and sender terminal ID of the non-IMS message to a receiver terminal of the non-IMS message through a home network of the non-IMS message.

Another method for transmitting messages between heterogeneous networks is provided in an embodiment of the disclosure. The method includes the following steps:

receiving a non-IMS message from a non-IMS network;

converting the content format of the non-IMS message into the content format of an IMS message, and converting a receiver terminal ID of the non-IMS message into the receiver terminal ID of an IMS message; and sending the IMS message that includes the IMS message content and the receiver terminal ID of the IMS message to the receiver terminal of the IMS message through an IMS network.

A message conversion apparatus is provided in an embodiment of the disclosure. The apparatus includes:

a receiving module, adapted to receive an IMS message from an IMS network;

a converting module, adapted to convert the IMS message into a non-IMS message; and a sending module, adapted to send the non-IMS message to a home network of the non-IMS message, where the home network sends the non-IMS message to a receiver terminal of the non-IMS message.

The converting module includes:

a content converting submodule, adapted to convert the content format of the IMS message into the content format of a non-IMS message; and a sender terminal ID converting submodule, adapted to convert the sender terminal ID of the IMS message into the sender terminal ID of a non-IMS message.

Another message conversion apparatus is provided in an embodiment of the disclosure. The apparatus includes:

a receiving module, adapted to receive a non-IMS message from a non-IMS network;

a converting module, adapted to convert the non-IMS message into an IMS message; and a sending module, adapted to send the IMS message to an IMS network, where the IMS network sends the IMS message to a receiver terminal of the IMS message.

The converting module includes:

a content converting submodule, adapted to convert the content format of the non-IMS message into the content format of an IMS message; and a receiver terminal ID converting submodule, adapted to convert the receiver terminal ID of the non-IMS message into the receiver terminal ID of the IMS message.

Compared with the conventional art, embodiments of the disclosure convert an IMS message into a non-IMS message and send the non-IMS message to a receiver terminal on a non-IMS network through the home network of the non-IMS message, thus implementing interworking between the IMS message and the non-IMS message. In addition, embodiments of the disclosure convert a non-IMS message into an IMS message and send the IMS message to a receiver terminal on an IMS network through the IMS network, thus implementing the interworking between the non-IMS message and the IMS message. Embodiments of the disclosure overcome the weakness of the conventional art in which the interworking between messages on an IMS network and a non-IMS network cannot be implemented.

DETAILED DESCRIPTION OF THE INVENTION

Embodiments of the disclosure provide a technical solution for interworking between IMS messages on the IMS network, such as Session Initiation Protocol (SIP) messages and other types of messages. The SIP messages include instant messages (IMs), and other types of messages include short messages and multimedia messages. The disclosure is hereinafter described in detail with reference to some exemplary embodiments and the accompanying drawings.

Embodiment 1:

This embodiment describes a solution for interworking between an IM and a short message or between IM and multimedia message by configuring a protocol conversion device to convert the message format.

Figure 1A:
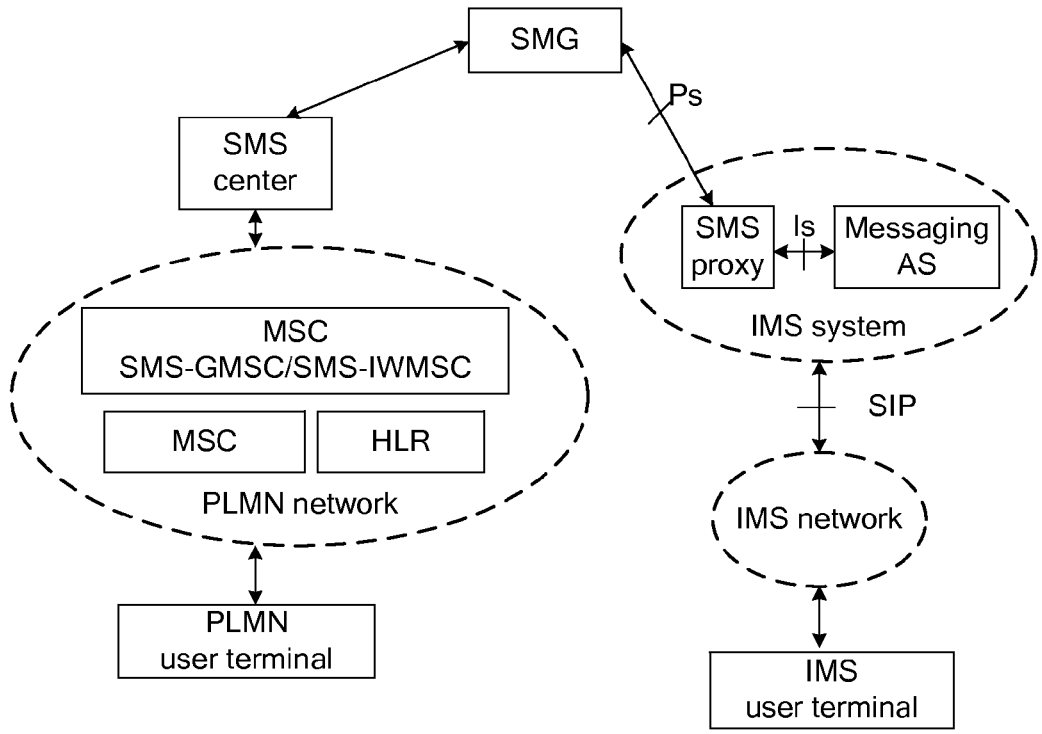
FIG. 1A and FIG. 1B show a networking structure of a first embodiment of the disclosure.
Figure 1B:
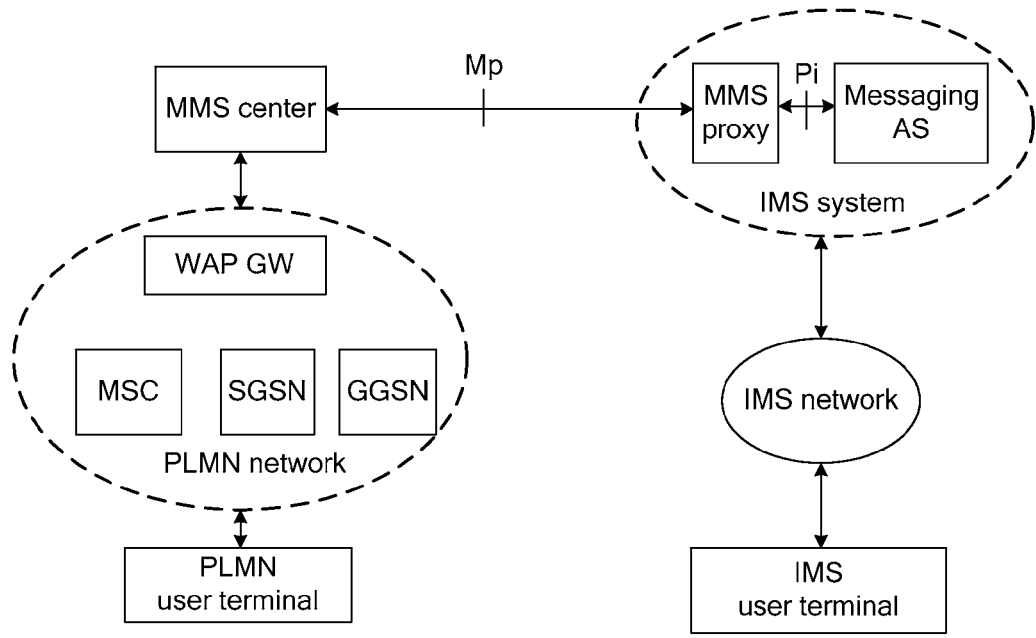

This embodiment implements the interworking between an IM and a short message by configuring an SMS proxy in the IMS system. It also implements interworking between an IM and a multimedia message by configuring an MMS proxy in the IMS system. FIG. 1A and FIG. 1B show network structures for interworking between an IM and a short message and between an IM and a multimedia message.

FIG. 1A shows the networking structure for interworking between an IM and a short message in the first embodiment of the disclosure. The networking structure in FIG. 1A includes a PLMN network and an IMS network, which are mutually independent.

The mobile switching center (MSC) and home location register (HLR) are core network elements (NEs) on 2G networks. The MSC is adapted to control terminal movement, and the HLR is adapted to store user information.

The SMS center, Gateway MSC for Short Message Service (SMS-GMSC), and Interworking MSC for Short Message Service (SMS-IWMSC) are adapted to provide sending and receiving SMS functions.

The SMG is adapted to transmit messages between the SMS center and the IMS system over the message gateway protocol.

The messaging AS is adapted to implement messaging services in the IMS system.

The SMS proxy is adapted to receive and transmit messages through interactions with the SMG, and convert the message format through interactions with the messaging AS. The SMS proxy is deployed over the same protocol as the SMG.

The interface between the SMS proxy and the SMG is a Ps interface, which uses a protocol specified by the operator, for example, the Short Message Peer to Peer (SMPP) protocol, China Mobile Peer to Peer (CMPP) protocol or other message gateway protocols. The interface between the SMS proxy and the messaging AS is an Is interface, which uses a private protocol.

After the SMS proxy is started, the SMS proxy registers with the SMG to configure information such as address, account, and protocol type of the SMG so that the SMS proxy can interact with the SMG. For example, when the SMG originates a registration request to the SMS proxy, it sends the ID of a configuration file to the SMS proxy. Then, the SMS proxy obtains the configuration file, and configures the information in the configuration file locally, where the information may include an IP address of the SMS proxy, an IP address of the SMG a protocol port number of the SMG, a service provider (SP) account of the SMG, a protocol ID (indicating the protocol used between the SMG and the SMS proxy), and a login mode.

FIG. 1B shows the networking structure for interworking between an IM and a multimedia message in the first embodiment of the disclosure. The networking structure in FIG. 1B includes a 2.5G network (PLMN network) and an IMS network, which are mutually independent.

The MSC, wireless application protocol gateway (WAP GW), gateway GPRS support node (GGSN), and serving GPRS support node (SGSN) are 2.5G NEs, and are adapted to perform mobility management on the terminal.

The MMS center is adapted to provide sending and receiving MMS functions.

The messaging AS is adapted to implement messaging services in the IMS system.

The SMS proxy is adapted to interact with the MMS center, and convert the message format through interactions with the messaging AS. The SMS proxy is deployed over the same protocol as the MMS center.

The interface between the MMS proxy and the MMS center is an Mp interface, which uses the MM7 protocol or MM4 protocol specified by the operator. The interface between the MMS proxy and the messaging AS is a Pi interface, which uses a private protocol.

The MMS center is configured with information about the MMS proxy. The information may be configured through the configuration interface, and includes an address of the MMS proxy. The MMS proxy is configured with information about the MMS center. The configuration information may be set by reading the configuration file, and include an IP address of the MMS center, a protocol port number of the MMS center, an SP account of the MMS center, a protocol ID (indicating the protocol used between the MMS center and the MMS proxy), and a login mode.

Figure 2A:
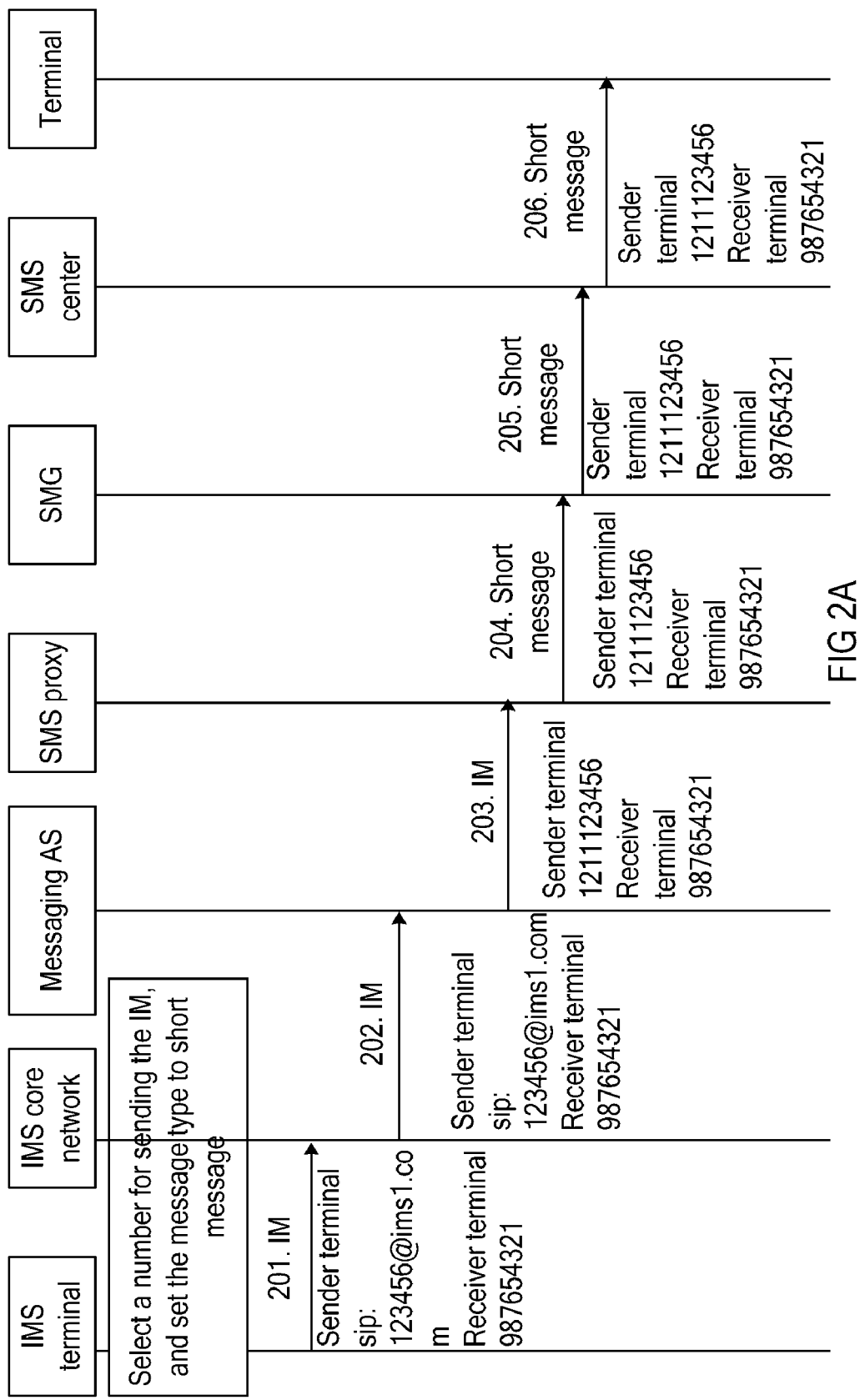
FIG. 2A and FIG. 2B show a process of interworking between a short message and an IM in the first embodiment of the disclosure.
Figure 2B:
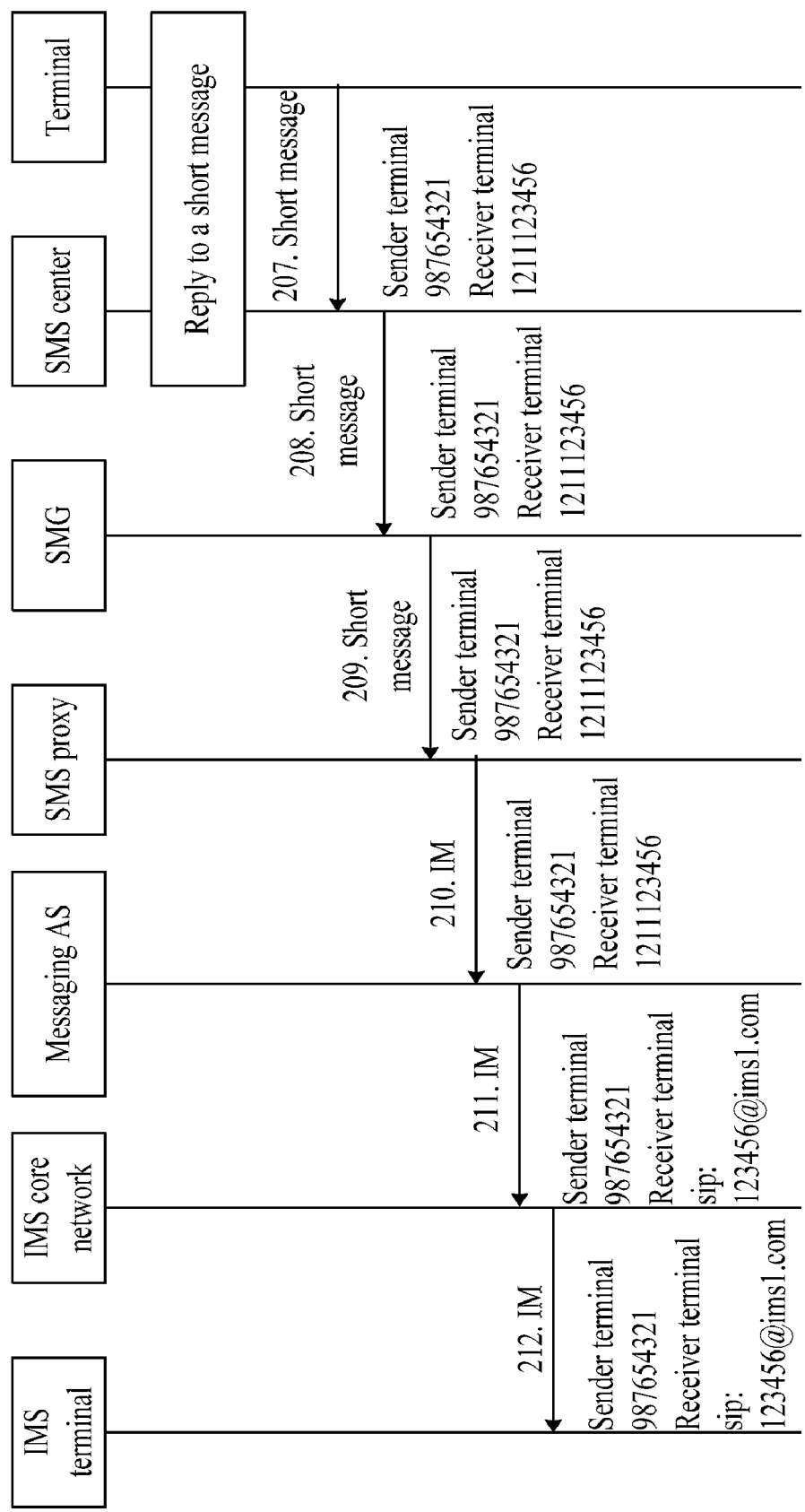

Based on the networking structure shown in FIG. 1A, FIG. 2A and FIG. 2B show a process of interworking between an IM (Instant Messaging) and a short message.

FIG. 2A shows a process of sending an IM to an SMS user by an IMS user in an embodiment of the disclosure, in which the signaling process between the messaging AS and the IMS terminal is the same as the process of receiving/sending an IM by the IMS system, and the signaling process between the SMS terminal and the SMS center is the same as the process of receiving/sending a short message on the PLMN network. The process includes the following steps:

Step 201: The IMS user terminal transmits an IM, sets the message type to short message, and sends the short message to the home IMS network of the IMS terminal.

The IMS terminal adds a message type ID to the IM body, and sets the message type to short message. For example, the message type is marked by the extended header "MsgTyp" of the Message/CPIM body.

The IMS terminal may also add a delivery report ID to the IM body to indicate whether the sender terminal needs to receive a delivery report. And the delivery report ID may be the value of the extended header "REPORT" of the Message/CPIM body.

The source address and destination address of the IM are SIPURI addresses, or the source address of the IM is a SIPURI address and the destination address is a user number. In this embodiment, the source address of the IM is 123456@ims1.com, and the destination address of the IM is "987654321".

Step 202: The home IMS network of the IMS terminal sends the IM to the home messaging AS of the IMS terminal.

Step 203: The home messaging AS of the IMS terminal obtains the IM content and the sender terminal number and the receiver terminal number of the IM, and sends the IM content to the SMS proxy when the message type is a short message.

Upon reception of the IM, the messaging AS determines that the IM is a short message, and performs the following operations:

Obtain the message text from the IM, and discard attachments (if the attachments are contained in the IM).

Obtain the user number from the destination address of the IM as the receiver terminal number of the short message. If the destination address of the IM is a user number, the messaging AS uses the user number as the receiver terminal number; if the destination address of the IM is a SIPURI address, the messaging AS obtains a user number according to the SIPURI address, for example, the messaging AS obtains the user number from the SIPURI address. The messaging AS may also obtain the user number according to the SIPURI address in the following mode: a binding relationship between an SMS user number and the SIPURI may be configured in the messaging AS or other network entities (for example, an independent ENUM server), so that the messaging AS may obtain the SMS user number associated with the SIPURI by querying the binding relationship. When the messaging AS obtains the SMS user number in the preceding mode, the user part of the SIPURI may be a non-numeric number.

The messaging AS obtains a user number from the source address of the IM, and adds a prefix to the number of the user to generate the sender terminal number. The prefix may be an SMS SP number allocated to the messaging AS.

In this embodiment, the receiver terminal number obtained by the messaging AS is "987654321", and the generated sender terminal number is "1211123456", where "1211" is an added SMS SP number.

The messaging AS determines that the message type ID is short message, and sends the message text, receiver terminal number and sender terminal number to the SMS proxy according to the message type.

If the IMS terminal sets a delivery report ID in the IM body, the messaging AS needs to send the delivery report to the sender terminal according to the delivery report ID after receiving the delivery report from the SMS center.

Step 204: The SMS proxy converts the IM into a short message according to the message content, receiver terminal number, and sender terminal number, and sends the short message to the SMG.

The SMS proxy converts the code of the message text into a UCS2 character set, and uses the received receiver terminal number and sender terminal number as the receiver terminal number and sender terminal number of the short message. The SMS proxy may also set a delivery report ID to indicate whether a delivery report is needed. If the delivery report ID indicates that the delivery report is needed, the SMS center sends the delivery report to the SMS proxy according to the delivery report ID after receiving the short message from the SMS proxy. Then, the SMS proxy obtains the IP address of the SMG according to the configuration information of the SMS proxy, and sends the converted short message to the SMG. If the length of the message body exceeds the limit of the short message protocol, the message is sent by fragments.

In the preceding process, the SMS proxy receives the IM from the messaging AS over the private protocol, and sends a short message to the SMG over a specified gateway protocol.

Steps 205 and 206: The SMG forwards the short message to the SMS center, and the SMS center sends the short message to an SMS user terminal associated with the receiver terminal number.

What has been described above is a process of sending an IM to an SMS user by an IMS user. The process of sending an IM to an MMS user by an IMS user is similar to the process of sending an IM to an SMS user by an IMS user except that: The IMS user sets the message type to multimedia message; after the IMS user terminal sends the IM to the messaging AS, the messaging AS obtains the text and attachments, receiver terminal number, and sender terminal number (including an MMS SP number allocated to the messaging AS) from the IM, and sends the obtained information to the MMS proxy; the MMS proxy performs protocol conversion to generate a multimedia message, and sends the multimedia message to the MMS center; the MMS center sends the multimedia message to the MMS terminal according to the receiver terminal number corresponding to the multimedia message.

FIG. 2B shows a process of sending a short message to an IMS user by an SMS user in the first embodiment of the disclosure, in which the signaling process between the SMS terminal and the SMS center refers to the process of receiving/sending short messages on 2G networks, and the process between the messaging AS and the IMS terminal refers to the process of receiving/sending IMs in the IMS domain. The process includes the following steps:

Step 207: The SMS terminal sends a short message to the SMS center, with the receiver terminal number in the short message carrying an SMS SP number.

When the SMS user replies to a short message sent from the IMS user, the SMS user may use the sender terminal number in the received short message as the receiver terminal number of the reply. Because an SMS SP number is added to the sender terminal number in the short message when the IMS user sends the short message to the SMS user, the receiver terminal number in the short message reply of the SMS user should include the SP number.

In this embodiment, the receiver terminal number of the short message is "1211123456", where "1211" is the SMS SP number, and the sender terminal number of the short message is "987654321".

Step 208: The SMS center determines that the message receiver terminal does not belong to the local network according to the SMS SP number in the receiver terminal number of the short message, and sends the short message to the SMG.

Step 209: The SMG sends the short message to the SMS proxy according to the SMS SP number in the receiver terminal number.

In this embodiment, the SMS SP number is associated with the address of the SMS proxy, and the SMG is configured with the address information of the SMS proxy. Thus, the SMG may send the short message to the SMS proxy according to the SP number in the receiver terminal number.

Step 210: The SMS proxy obtains the content, receiver terminal number, and sender terminal number from the short message, and sends the obtained information to the messaging AS according to the SMS SP number.

After receiving the short message, the SMS proxy obtains the message body, receiver terminal number, and sender terminal number, where the message body uses a GBK character set, and sends the obtained message body, receiver terminal number, and sender terminal number to an messaging AS associated with the SMS SP number, where the messaging AS is the home messaging AS of the IMS terminal.

In the preceding process, the SMS proxy receives the short message from the SMG over a specified gateway protocol, and sends the obtained information to the messaging AS over a private protocol.

Step 211: The home messaging AS of the IMS terminal converts the short message into an IM according to the short message content, receiver terminal number, and sender terminal number, and sends the IM to the IMS network.

The messaging AS converts the short message into an IM according to the message content, receiver terminal number, and sender terminal number sent from the SMS proxy. The details are as follows:

The messaging AS converts the text format of the message body into a UTF-8 format;

The messaging AS deletes the SMS SP number from the receiver terminal number, and adds a local domain name to generate the SIPURI of the IM receiver terminal. In this embodiment, the messaging AS deletes the SP number from the receiver terminal number "1211123456" and obtains a new receiver terminal number "123456". Then, the messaging AS adds the local domain name to the new receiver terminal number to generate the following SIPURI of the receiver terminal: sip:123456@ims1.com.

The messaging AS assembles the converted text and address information of the message into an IM, and adds a message type ID to the IM, where the message type ID is set to short message ID. Because the SMG in this embodiment does not support a delivery report, the delivery report ID cannot be added to the IM. In this case, the delivery report is not needed by default.

Step 212: The home IMS network of the IMS terminal sends the IM to the IMS terminal associated with the SIPURI of the receiver terminal.

The preceding FIG. 2B describes a process of sending a short message to an IMS user by an SMS user. The process of sending a multimedia message to an IMS user by an MMS user is similar to the process of sending a short message to an IMS user by an SMS user except that: The receiver terminal number in the multimedia message sent from the MMS user carries an MMS SP number (for example, "1212") allocated to the messaging AS; after the MMS user sends the message to the MMS center, the MMS center routes the multimedia message to the MMS proxy according to the SP number; the MMS proxy obtains the message content, sender terminal number, and receiver terminal number from the message, and sends the obtained information to the messaging AS associated with the SP number; the messaging AS converts the multimedia message into an IM, and sends the IM to the IMS terminal according to the destination address of the IM associated with the receiver terminal number.

During the specific implementation, the MMS proxy may store the received message in a specified directory in the messaging AS, and the messaging AS reads files and receives messages from the directory on a timed basis.

Embodiment 2:

This embodiment describes a solution for interworking between an IM and a short message or between an IM and a multimedia message by configuring a protocol conversion device to convert the message format. This embodiment implements interworking between an IM and a short message by configuring an SMS proxy in the IMS system. It also implements interworking between an IM and a multimedia message by configuring an MMS proxy in the IMS system. FIG. 1A and FIG. 1B show network structures for interworking between an IM and a short message and between an IM and a multimedia message.

The process of sending an IM to an SMS user by an IMS user includes the following steps:

Step 201': The IMS user terminal transmits an IM, and sends the IM to the home IMS network of the IMS terminal.

The IMS terminal adds a message type ID to the IM body, and sets the message type to short message.

In this embodiment, the source address of the IM is 123456@ims1.com, and the destination address of the IM is "987654321".

Step 202': The home IMS network of the IMS terminal sends the IM to the home messaging AS of the IMS terminal.

Step 203: The home messaging AS of the IMS terminal obtains the IM content and sender terminal number and receiver terminal number of the IM, and sends the obtained information to the SMS proxy according to the message type.

After receiving the IM, the messaging AS performs the following operations:

Obtain the message text from the IM, and discard attachments (if the attachments are contained in the IM).

Obtain a user ID "123456" from the source address of the IM, and take the user ID as the sender terminal number.

The messaging AS determines that the message type ID is short message, and sends the message text, receiver terminal number and sender terminal number to the SMS proxy.

Step 204': The SMS proxy converts the IM into a short message according to the message content, receiver terminal number, and sender terminal number of the IM, and sends the short message to the SMG.

The SMS proxy converts the code of the message text into a UCS2 character set, and sets the received sender terminal number and receiver terminal number to the sender terminal number and receiver terminal number of the short message. Then, the SMS proxy obtains the IP address of the SMG according to its own configuration information, and sends the converted short message to the SMG.

Steps 205' and 206': The SMG forwards the short message to the SMS center, and the SMS center sends the short message to an SMS user terminal associated with the receiver terminal number.

What has been described above is a process of sending an IM to an SMS user by an IMS user. The process of sending an IM to an MMS user by an IMS user is similar except that: The IMS user sets the message type to multimedia message; after the IMS user terminal sends the IM to the messaging AS, the messaging AS obtains the text and attachments, receiver terminal number, and sender terminal number from the IM according to the message type, and sends the obtained information to the MMS proxy; the MMS proxy performs protocol conversion to generate a multimedia message, and sends the multimedia message to the MMS center; the MMS center sends the multimedia message to the MMS terminal.

The process of sending a short message to an IMS user by an SMS user includes the following steps:

Step 207': The SMS user terminal sends a short message to the SMS center.

When the SMS user replies to the short message sent from the IMS user, the SMS user may use the sender terminal number in the received short message as the receiver terminal number of the reply. In this embodiment, a user with the number "987654321" receives a short message from a user with the number "123456", and replies to the short message.

Step 208': The SMS center sends the short message to the SMG according to the route information associated with the receiver terminal number that is stored in the network.

In this embodiment, the route information of the IMS user is configured in the HLR on the SMS network. During the process of sending the short message to the IMS user by the SMS user, the SMS center searches the HLR for the IMS user number and related route information (pointing to the SMS proxy), and sends a short message to the SMG according to the obtained route information.

Step 209': The SMG sends the short message to the SMS proxy according to the route information associated with the receiver terminal number.

Step 210: The SMS proxy obtains the content, receiver terminal number, and sender terminal number from the short message, and sends the obtained information to the messaging AS associated with the receiver terminal number.

The association between the IMS user number and the home messaging AS of the IMS user number needs to be configured in the SMS proxy. The SMS proxy obtains the home messaging AS of the receiver terminal number (IMS user number) according to the association.

Step 211': The messaging AS converts the short message into an IM according to the short message content, receiver terminal number, and sender terminal number, and sends the IM to the home IMS network of the IMS terminal of the receiver terminal.

The messaging AS converts the short message content, receiver terminal number and sender terminal number sent from the SMS proxy into an IM. The details are as follows:

The messaging AS converts the text format of the message boxy into a UTF-8 format;

The messaging AS adds the local domain name to the receiver terminal number to generate the SIPURI of the receiver terminal. In this embodiment, upon format conversion, the destination address is "sip:123456@ims1.com", and the source address is "987654321".

The messaging AS adds a message type ID to the IM, and sets the message type ID to short message.

Step 212': The home IMS network of the IMS terminal of the receiver terminal sends the IM to the IMS terminal associated with the SIPURI of the receiver terminal.

What has been described above is a process of sending a short message to an IMS user by an SMS user. The process of sending a multimedia message to an IMS user by an MMS user is similar.

According to the first embodiment and the second embodiment of the disclosure, the protocol conversion function of a message is performed by setting an SMS (or MMS) proxy in the networking structure. In addition, the SMS (or MMS) proxy may work with a messaging AS on the IMS network to implement interworking between a short message (multimedia message) and an IM. During the implementation of the two embodiments, a short message (or multimedia message) type ID may be added to the IM so that the IM can be routed to the SMS (or MMS) proxy; an SMS (or MMS) SP number may be added to the sender terminal number in the IM so that the short message or multimedia message can be routed to the SMS (or MMS) proxy according to the SP number during the short message reply. Thus, the interworking between messages can be implemented. During the short message (multimedia message) reply, the short message (or multimedia message) may also be routed to the SMS (or MMS) proxy according to the route information associated with the receiver terminal number that is stored in the network.

Embodiment 3:

This embodiment describes a solution for interworking between an IM and a short message or between an IM and a multimedia message by converting the message format through an independent gateway.

Figure 3A:
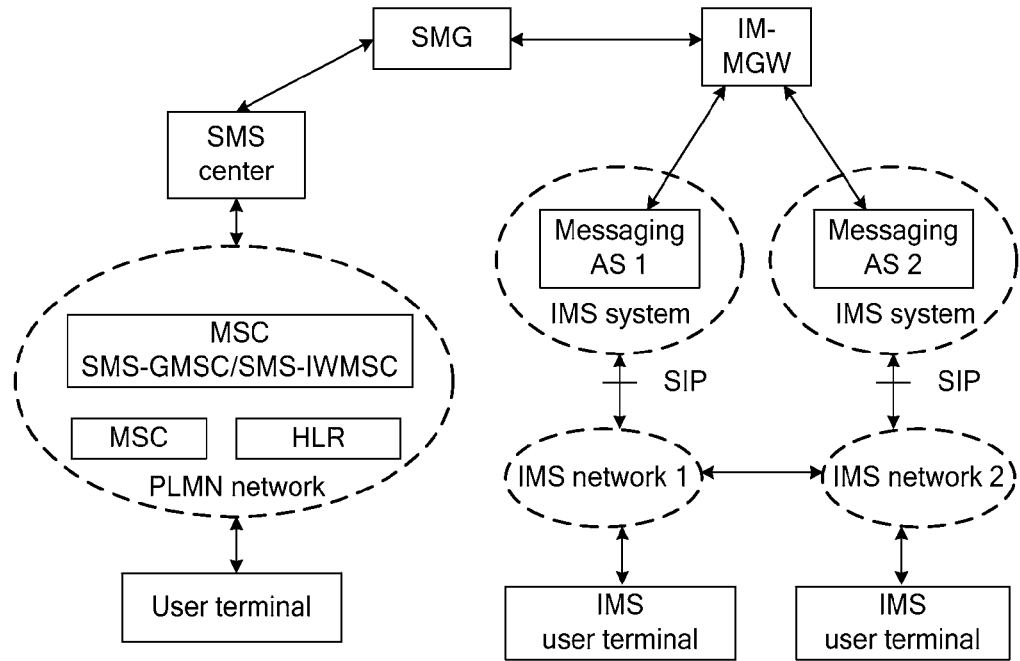
FIG. 3A, FIG. 3B, FIG. 3C, and FIG. 3D show a networking structure of a second embodiment of the disclosure.
Figure 3B:
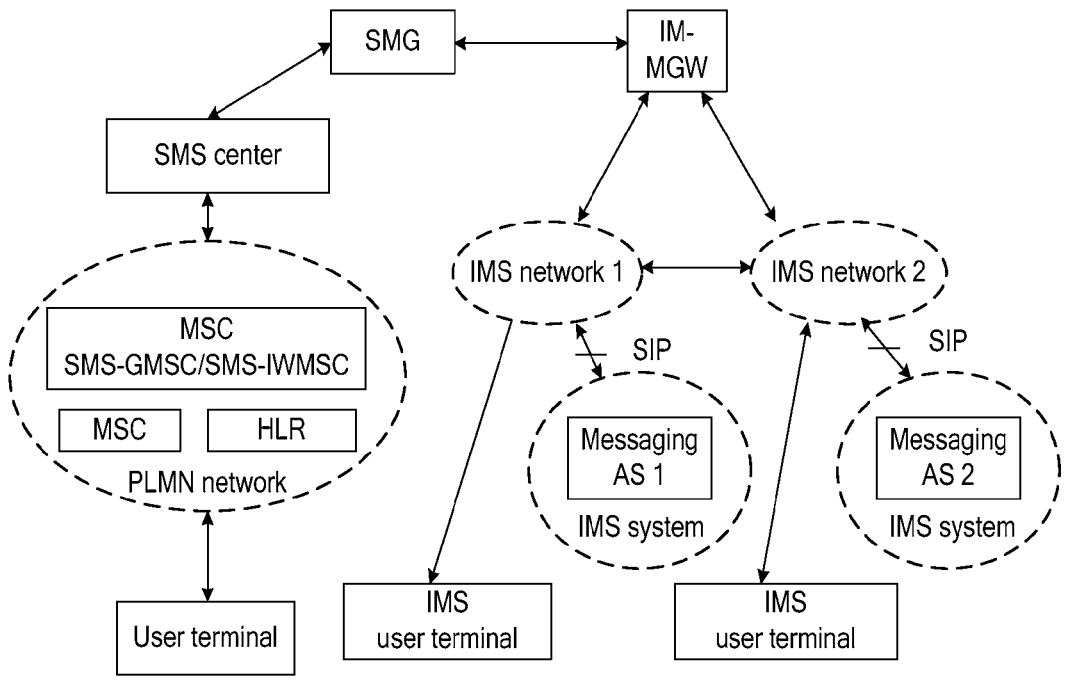

This embodiment implements interworking between an IM and a short message and between an IM and a multimedia message by configuring an IM-MGW (IM media gateway) in the IMS system. FIG. 3A, FIG. 3B, FIG. 3B, and FIG. 3D show networking structures for interworking.

FIG. 3A shows the networking structure for interworking between an IM and a short message in the third embodiment of the disclosure. The networking structure in FIG. 3A includes a PLMN network and an IMS network, which are mutually independent.

The MSC and HLR are core NEs on 2G networks, where the MSC is adapted to control terminal movement, and the HLR is adapted to store user information.

The SMS center, SMS-GMSC, and SMS-IWMSC are adapted to provide SMS functions.

The SMG is adapted to transmit messages between the SMS center and the IMS system over the message gateway protocol.

The messaging AS is adapted to implement messaging services in the IMS system.

The IM-MGW, as an independent gateway, uses the protocol of the peer network when connecting to different networks. In this embodiment, the IM-MGW receives/sends messages through interactions with the SMG, and converts the message format through interactions with the messaging AS. The IM-MGW and the messaging AS may communicate over the SIP protocol, and the IM-MGW and the SMG may communicate over the message gateway protocol.

The IM-MGW is configured with information such as the addresses of the SMG and the messaging AS and protocol type. The SMG is configured with information such as the address of the IM-MGW and SP number of the IM-MGW, for example, "333333".

FIG. 3B shows another networking structure for interworking between an IM and a short message. In this networking structure, the IMS network is connected to the IM-MGW, and the IMS network routes the IMS message that is sent by the messaging AS in the IMS system to the IM-MGW for message conversion, or the IMS network sends the IMS message upon conversion by the IM-MGW to the messaging AS in the IMS system.

Figure 3C:
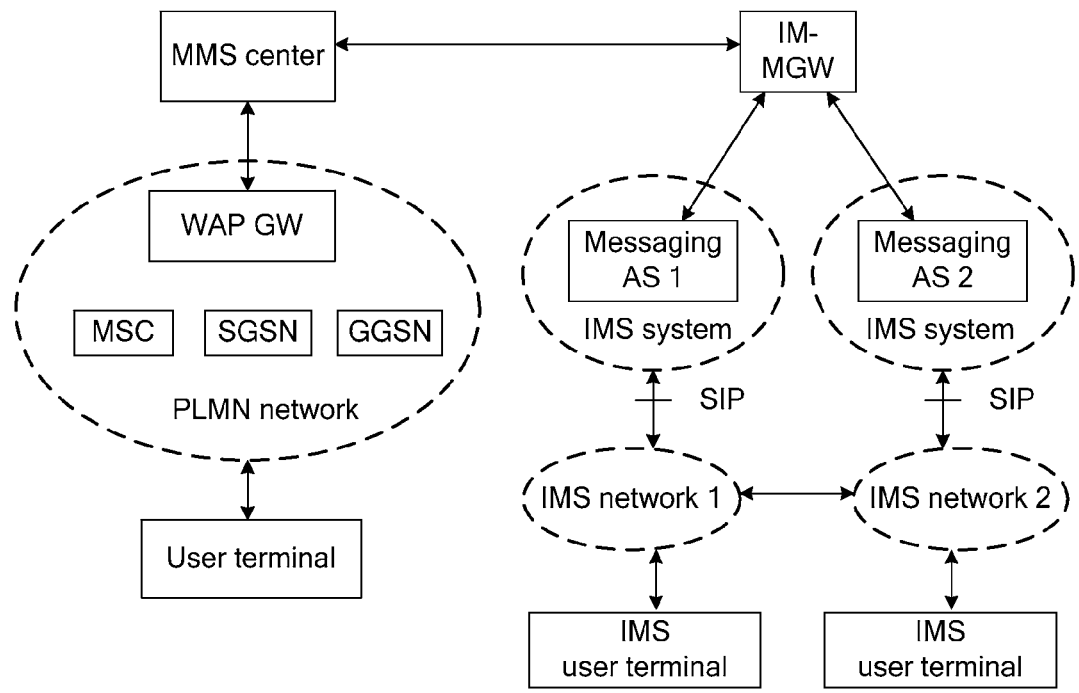
Figure 3D:
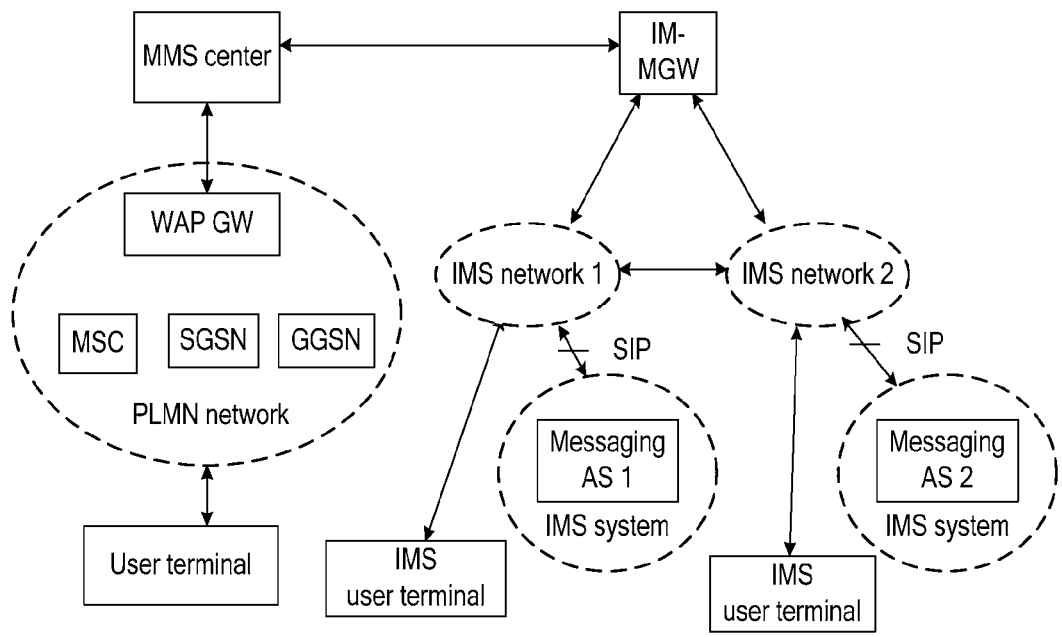

FIG. 3C shows a networking structure for interworking between an IM and a multimedia message in the third embodiment of the disclosure. The networking shown in FIG. 3C includes a 2.5G network (PLMN network) and an IMS network, which are mutually independent.

The MSC, WAP GW, GGSN, and SGSN are 2.5G NEs, and are adapted to perform mobility management on the terminal.

The MMS center is adapted to provide sending and receiving MMS functions.

The messaging AS is adapted to implement messaging services in the IMS system.

The IM-MGW, as an independent gateway, uses the protocol of the peer network when connecting to different networks. In this embodiment, the IM-MGW interacts with the MMS center, and interacts with the messaging AS to convert the message format. The IM-MGW and the messaging AS may communicate over the SIP protocol, and the IM-MGW and the MMS center may communicate over the message gateway protocol.

The MMS center is configured with information such as the address of the IM-MGW. The IM-MGW is configured with information such as the addresses of the MMS center and the messaging AS and protocol type. The MMS center is also configured with the SP number of the IM-MGW, for example, "333333".

FIG. 3D shows another networking structure for interworking between an IM and a multimedia message. In this networking structure, the IMS network interacts with the IM-MGW, and the IMS network routes the IMS message that is sent by the messaging AS in the IMS system to the IM-MGW for message conversion, or the IMS network sends the IMS message upon conversion by the IM-MGW to the messaging AS in the IMS system.

Figure 4A:
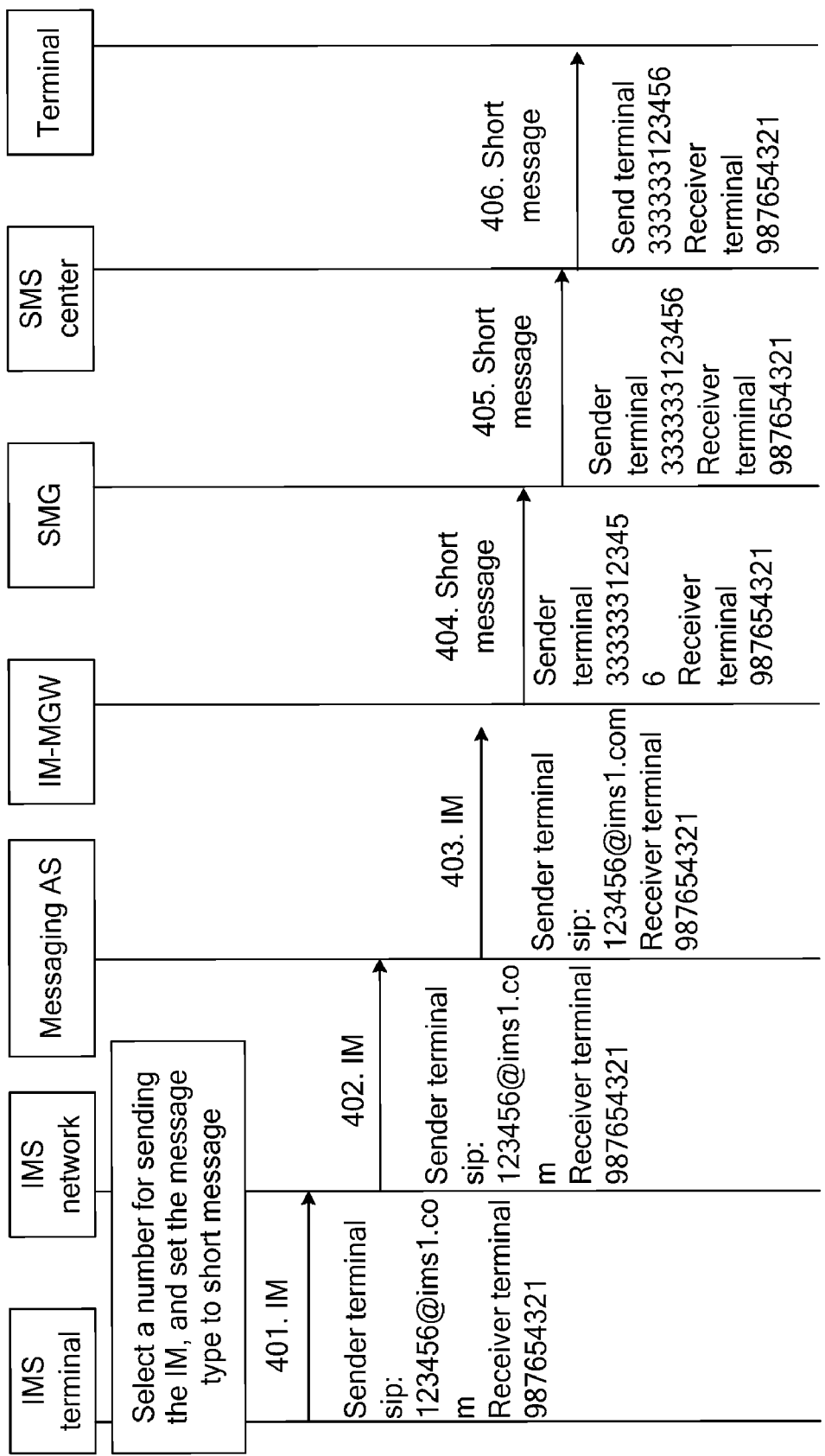
FIG. 4A and FIG. 4B show a process of interworking between a short message and an IM in a third embodiment of the disclosure.
Figure 4B:
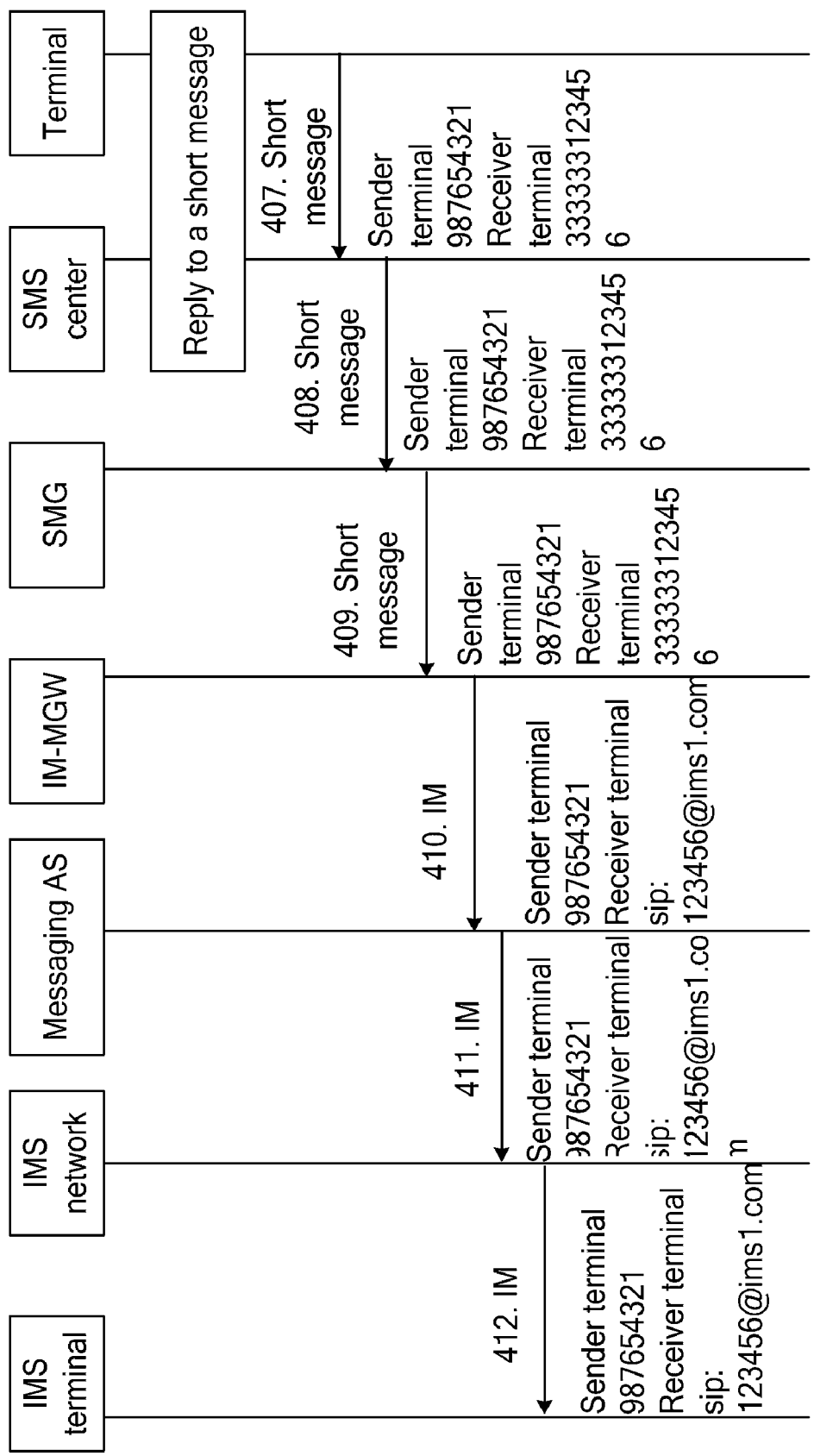

Based on the networking structure shown in FIG. 3A, FIG. 4A and FIG. 4B show a process of interworking between an IM and a short message.

FIG. 4A shows a process of sending an IM to an SMS user by an IMS user in the third embodiment of the disclosure, in which the signaling process between the messaging AS and the IMS terminal is the same as the process of receiving/sending an IM by the IMS system, and the signaling process between the SMS terminal and the SMS center is the same as the process of receiving/sending a short message on the PLMN network. The process includes the following steps:

Step 401: The IMS user terminal sets the IM to carry a short message ID, and sends the IM to the home IMS network of the terminal.

The IMS terminal adds a message type ID to the IM body, and sets the message type ID to short message.

In this embodiment, the IMS user uses "sip:123456@ims1.com" to log in to the IMS client, and sends an IM to the user with the number "987654321", where the message type in the IM is set to short message.

Step 402: The home IMS network of the IMS terminal sends the IM to the home messaging AS of the IMS terminal.

Step 403: The home messaging AS of the IMS terminal sends the IM to the IM-MGW according to the message type.

The association between the message type and the IM-MGW address is configured in the home messaging AS of the IMS terminal. The messaging AS may send the IM to the IM-MGW according to the short message type ID.

Step 404: After receiving the IM, the IM-MGW converts the IM into a short message according to the short message type ID, and sends the short message to the SMG.

After receiving the IM, the IM-MGW parses the IM, and performs the following operations according to the short message type ID:

Obtain the message text from the IM, and discard attachments (if the attachments are contained in the IM).

Obtain a user number from the SIPURI of the sender terminal in the IM, and add the SP number of the IM-MGW to the user number to generate the sender terminal number of the short message.

The IM-MGW may also generate the sender terminal number of the short message in the following mode: The IM-MGW searches the local network entity or other network entities for the binding relationship between the SIPURI and the user number, and obtains a user number associated with the SIPURI of the IM sender terminal.

The IM-MGW converts the message text of the IM into the short message format, assembles the converted text and address into a short message, and sends the short message to the SMG.

In this embodiment, the IM-MGW generates a sender terminal number "333333123456" according to the SIPURI "sip:123456@ims1.com" of the sender terminal, where "333333" is the SP number of the IM-MGW. The IM-MGW converts the code of the message text into a UCS2 character set, sets the obtained receiver terminal number and sender terminal number to be the receiver terminal number and sender terminal number of the short message, and assembles them into a short message. Then, the IM-MGW obtains the IP address of the SMG according to the short message type ID and its own configuration information, and sends the short message to the SMG. If the length of the message body exceeds the limit of the short message protocol, the IM-MGW sends the short message by fragments.

In this embodiment, the receiver terminal number of the IM is the user number on the SMS network. The receiver terminal of the IM may also use the SIPURI address ID. In this case, during the message conversion, the IM-MGW also needs to convert the SIPURI of the receiver terminal into the user number on the SMS network. For example, the IM-MGW may search the local network entity or other network entities for the binding relationship between the SIPURI and the user number on the SMS network, and obtain the user number on the SMS network associated with the receiver terminal SIPURI of the IM.

Steps 405 and 406: The SMG forwards the short message to the SMS center according to the receiver terminal number of the short message. The SMS center sends the short message to the SMS user terminal associated with the receiver terminal number.

What has been described above is a process of sending an IM to an SMS user by an IMS user. The process of sending an IM to an MMS user by an IMS user is similar except that: The IMS user sets the message type to multimedia message; after the IMS user terminal sends the IM to the messaging AS, the messaging AS sends the IM to the IM-MGW as a multimedia message; the IM-MGW obtains the text and attachments, receiver terminal number, and sender terminal number (including the SP number of the IM-MGW) from the IM, assembles the obtained information into a multimedia message, and sends the multimedia message to the MMS center; the MMS center sends the multimedia message to the MMS user terminal.

FIG. 4B shows a process of sending a short message to an IMS user by an SMS user in the third embodiment of the disclosure, in which the signaling process between the SMS terminal and the SMS center is the same as the process of receiving and sending a short message on 2G networks, and the process between the messaging AS and the IMS terminal is the same as the process of receiving and sending an IM message in the IMS domain. The process includes the following steps:

Step 407: The SMS user terminal sends a short message to the SMS center, with the receiver terminal number of the short message carrying the SP number of the IM-MGW.

When replying to a short message sent from the IMS user, the SMS user may use the sender terminal number of the short message as the receiver terminal number of the reply. In this embodiment, an SMS user with the number "987654321" receives a short message from a user with the number "333333123456" (where the "333333" is the SP number of the IM-MGW), and replies to the user number.

Step 408: The SMS center determines that the message receiver terminal does not belong to the network according to the SP number in the receiver terminal number, and sends the short message to the SMG.

Step 409: The SMG sends the short message to the IM-MGW according to the SP number in the receiver terminal number.

In this embodiment, the SP number of the IM-MGW is associated with the address of the IM-IGW. The SMG is configured with the address information of the IM-MGW, so that the SMG can send the short message to the IM-MGW according to the SP number of the IM-MGW in the receiver terminal number.

Step 410: After receiving the short message, the IM-MGW converts the short message into an IM, determines the home messaging AS of the receiver terminal according to the receiver terminal number, and sends the IM to the messaging AS.

After receiving the short message, the IM-MGW parses the short message to obtain the message body, receiver terminal number, and sender terminal number, and performs the following operations according to the short message type:

Convert the text format of the message body into the UTF-8 format;

Delete the SP number from the receiver terminal number, and add a domain name after the receiver terminal number to generate the SIPURI of the receiver terminal according to the association between the user number configured in the IM-MGW and the IMS domain. In this embodiment, the generated SIPURI of the receiver terminal is "sip:123456@ims1.com". The IM-MGW may also generate the SIPURI of the sender terminal in the following mode: the IM-MGW searches the local network entity or other network entities for the binding relationship between the SIPURI and the user number, deletes the SP number from the receiver terminal number to obtain a user number, and obtains the user number associated with the sender terminal SIPURI of the IM according to the binding relationship between the SIPURI and the user ID stored in the local network entity or other network entities in the IM-MGW;

The IM-MGW adds a message type ID to the IM, and sets the message type ID to short message.

Then, the IM-MGW assembles the converted message content, address information, and message type ID into an IM, and sends the IM to the messaging AS associated with the SIPURI of the receiver terminal.

Steps 411 and 412: The messaging AS sends the IM to the IMS network, and the IMS network sends the IM to the IMS terminal associated with the SIPURI of the receiver terminal.

What has been described above is a process of sending a short message to an IMS user by an SMS user in FIG. 4B. The process of sending a multimedia message to an IMS user by an MMS user is similar except that: The receiver terminal number in the multimedia message sent by the MMS user carries the SP number of the IM-MGW; after the MMS user sends the multimedia message to the MMS center, the MMS center routes the multimedia message to the IM-MGW according to the SP number of the IM-MGW; the IM-MGW obtains the message content, sender terminal number, and receiver terminal number from the multimedia message, assembles the obtained information into an IM, and sends the IM to the messaging AS according to the association between the receiver terminal number and the messaging AS; the messaging AS sends the IM to the IMS terminal.

In the preceding process, because the IM-MGW is configured with the user information in all IMS domains, the IM-MGW may obtain the related IMS or SIPURI according to the user ID in the receiver terminal number after receiving the short message or multimedia message reply of the SMS user or MMS user. When the user information in any IMS domain is changed, the user data needs to be synchronized in the IM-MGW.

Embodiment 4:

This embodiment describes how to convert the message format by configuring a protocol conversion device, and how to implement the interworking between an IM and a short message or between an IM and a multimedia message according to the message forwarding policy in the home messaging AS of the IMS receiver terminal.

This embodiment implements the interworking between an IM and a short message and between an IM and a multimedia message by configuring an IM-MGW in the IMS system, as shown in FIG. 3A and FIG. 3B.

Figure 5A:
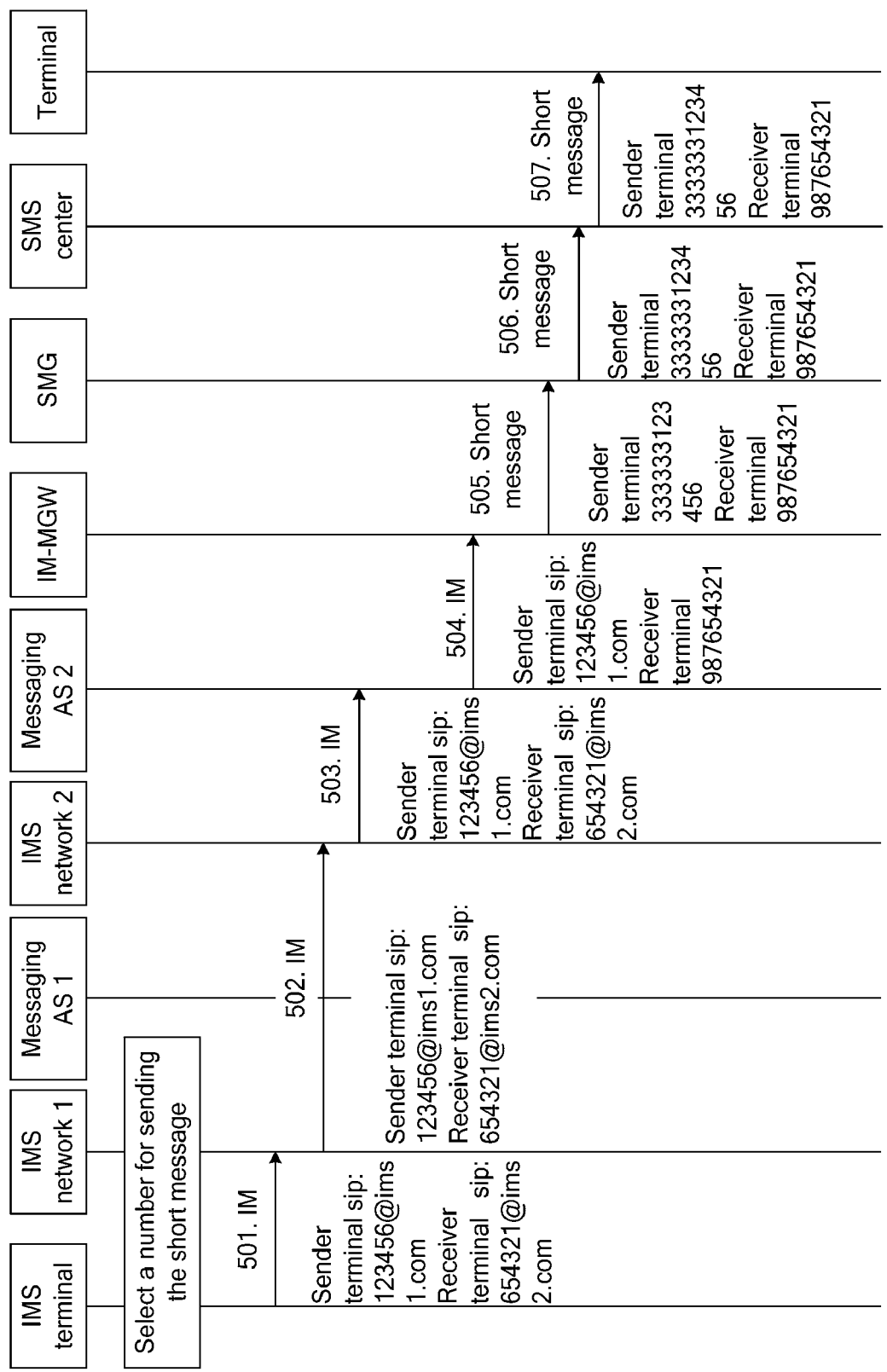
FIG. 5A and FIG. 5B show a process of interworking between a short message and an IM in a fourth embodiment of the disclosure.

FIG. 5A shows a process of sending an IM to an SMS user number (number used by an SMS network) bound to an IMS receiver terminal in the form of short message by an IMS sender terminal in the fourth embodiment of the disclosure. The IMS network 1 and the messaging AS 1 are the home IMS network and messaging AS of the IMS sender terminal. The IMS network 2 and the messaging AS 2 are the home IMS network and messaging AS of the IMS receiver terminal bound to the SMS user number in FIG. 5A. The messaging AS 2 is configured with the message forwarding policy set by the receiver terminal and the binding relationship between the SIPURI of the IMS receiver terminal and the user number in the SMS network. The IM-MGW is configured with the user information in each IMS domain. The process of sending an IM to the IMS receiver terminal and sending the IM to the user number bound to the IMS receiver terminal in the form of short message by the IMS sender terminal includes the following steps:

Step 501: The IMS sender terminal transmits an IM, and sends the IM to the home IMS network of the IMS terminal.

In this embodiment, an IMS user with the SIPURI "sip:123456@ims1.com" logs in to the IMS client, and sends the IM to an IMS user with the SIPURI "sip:654321@ims2.com".

Step 502: The home IMS network of the IMS sender terminal sends the IM to the home IMS network of the IMS receiver terminal according to the SIPURI of the receiver terminal.

Step 503: The home IMS network of the IMS receiver terminal sends the IM to the home messaging AS of the IMS receiver terminal.

Step 504: The home messaging AS of the IMS receiver terminal sends the IM to the IM-MGW according to the configured message forwarding policy.

The home messaging AS of the IMS receiver terminal is configured with the message forwarding policy set by the IMS receiver terminal. For example, the receiver terminal sets the forwarding policy as follows: When the IMS receiver terminal is online, the messaging AS sends the IM to the IMS receiver terminal directly; when the IMS receiver terminal is offline and an offline policy is configured to forward the IM to the SMS user number bound to the IMS receiver terminal in the form of short message, the messaging AS sends the IM to the IM-MGW. The forwarding policy set by the IMS receiver terminal may also be unconditional forwarding. In this case, the home messaging AS of the IMS receiver terminal sends the IM to the IM-MGW directly without judging whether the IMS receiver terminal is online.

In this embodiment, the home messaging AS 2 of the IMS receiver terminal determines that the current IMS receiver terminal is offline and the IMS receiver terminal sets an offline forwarding policy in the messaging AS 2, where the offline forwarding policy indicates that when the IMS user is offline, the IM message should be forwarded to the SMS user number bound to the IMS user terminal in the form of short message. Thus, the messaging AS 2 sends the IM to the IM-MGW, and instructs the IM-MGW to convert the IM into a short message carrying the SMS user number bound to the IMS receiver terminal. In this embodiment, the SMS user number bound to the SIPURI of the receiver terminal "sip: 654321@ims2.com" is "987654321".

Step 505: After receiving the IM, the IM-MGW parses out the message content, source address, and destination address, assembles the parsed content into a short message according to the instruction of the messaging AS, and sends the short message to the SMG.

After receiving the IM, the IM-MGW performs the following steps according to the instruction that the IM should be converted into a short message from the messaging AS 2:

Obtain the message text from the IM, and discard attachments (if the attachments are contained in the IM).

Obtain the user number bound to the IM-MGW according to the receiver terminal SIPURI of the IM, and use the user number as the receiver terminal number.

Obtain the user number from the sender terminal SIPURI of the IM, and add the SP number of the IM-MGW to the user number to generate the sender terminal number; or search the local network entity or other network entities for the association between the SIPURI and the user number, and obtain the user number associated with the sender terminal SIPURI of the IM according to the association.

Convert the format of the message text into the short message format, assemble the converted message content and address into a short message, and send the short message to the SMG.

In this embodiment, the user number bound to "654321@ims2.com" that the messaging AS 2 receives is "987654321", where the "654321@ims2.com" is the receiver terminal ID in the IMS domain, and "987654321" is the receiver terminal ID in the SMS domain. The generated sender terminal number is "333333123456", where "333333" is the added SP number. The IM-MGW converts the code of the message text into a UCS2 character set, sets the obtained receiver terminal number and sender terminal number to be the receiver terminal number and sender terminal number of the short message, and assembles them into a short message. Then, the IM-MGW obtains the IP address of the SMG according to its own configuration information, and sends the short message to the SMG.

Steps 506 and 507: The SMG forwards the short message to the SMS center, and the SMS center sends the short message to the user terminal associated with the receiver terminal number.

What has been described above is a process of sending an IM to an IMS receiver terminal by an IMS user and a process of sending an IM to an IMS receiver terminal in the form of short message by the home messaging AS of the IMS receiver terminal according to the forwarding policy. The process of sending an IM to an IMS receiver terminal by an IMS sender terminal and sending an IM to an IMS receiver terminal through the IM-MGW in the form of multimedia message by the home messaging AS of the IMS receiver terminal according to the forwarding policy is similar to this process.

Figure 5B:
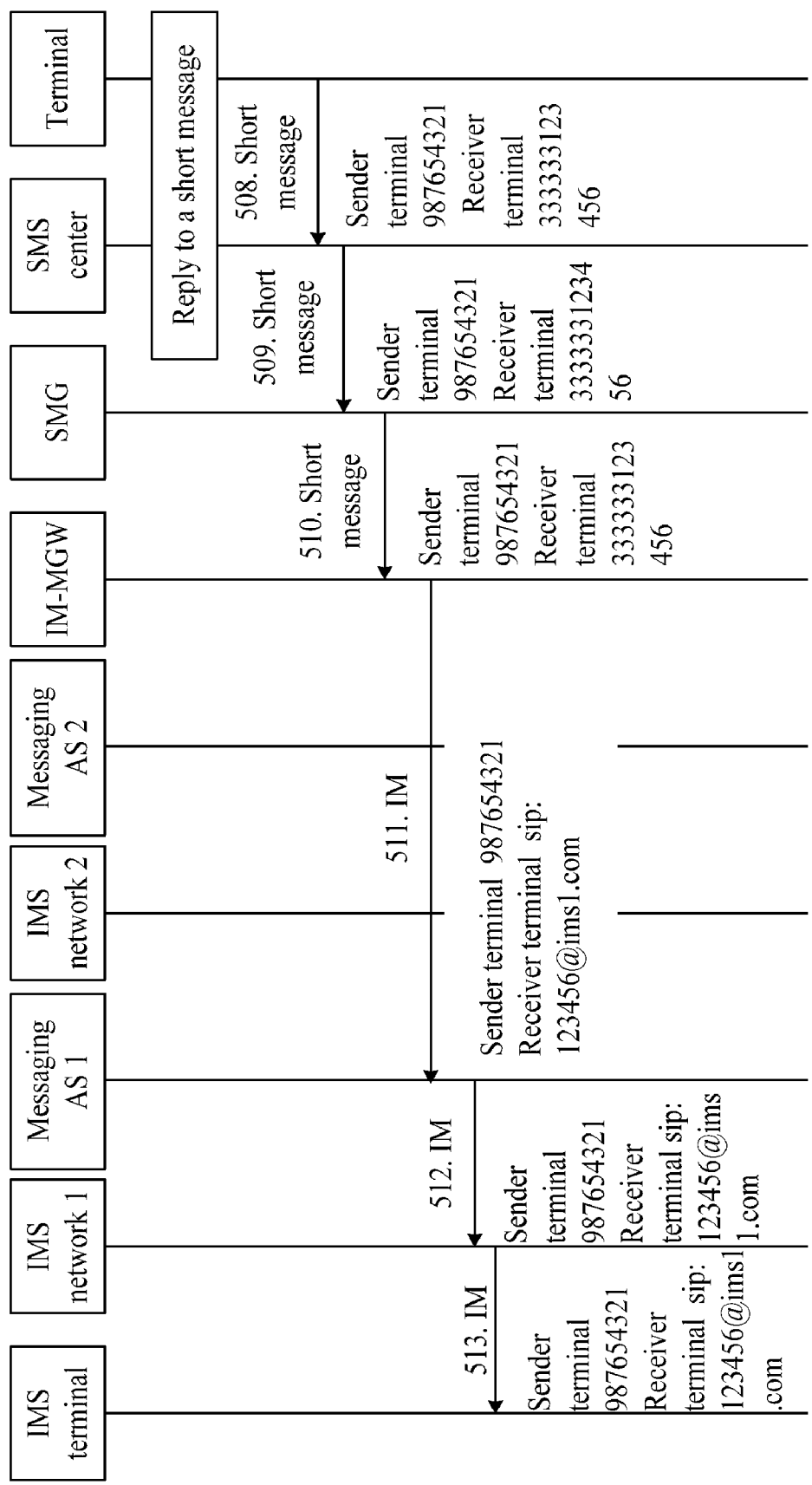

FIG. 5B is a process of making a short message reply to an SMS user number that is bound to an IMS terminal and sending the short message reply to the receiver terminal in the form of IM in the fourth embodiment of the disclosure. The IMS network 1 and the messaging AS 1 are the home IMS network and messaging AS of the IMS receiver terminal in FIG. 5B. The IMS network 2 and the messaging AS 2 are the home IMS network and the messaging AS of the IMS terminal bound to the SMS user number in FIG. 5B. The messaging AS 2 is configured with the message forwarding policy set by the IMS sender terminal and SMS user number associated with the SIPURI of the terminal. The IM-MGW is configured with the user information in each IMS domain. The process of sending a short message to the IMS receiver terminal according to the SMS user number bound to the IMS terminal and sending the short message to the IMS receiver terminal in the form of IM includes the following steps:

Step 508: Send a short message to the SMS center according to the SMS user number bound to the IMS terminal, with the receiver terminal number of the short message carrying the SP number of the IM-MGW.

When replying to the short message, the SMS receiver terminal may use the sender terminal number of the short message as the receiver terminal number of the short message reply. In this embodiment, a user terminal with the number "987654321" receives a short message from a user with the number "333333123456" (where the "333333" is the SP number of the IM-MGW), and replies to the user number.

Step 509: The SMS center determines that the receiver terminal of the short message does not belong to the network according to the SP number in the SMS receiver terminal number, and sends the short message to the SMG.

Step 510: The SMG sends the short message to the IM-MGW according to the SP number in the receiver terminal number.

In this embodiment, the SP number of the IM-MGW is associated with the address of the IM-IGW. The SMG is configured with the address information of the IM-MGW, so that the SMG can send the short message to the IM-MGW according to the SP number of the IM-MGW in the receiver terminal number.

Step 511: After receiving the short message, the IM-MGW converts the short message into an IM, and sends the IM to the home messaging AS of the IMS receiver terminal.

In this embodiment, after receiving the short message, the IM-MGW parses out the short message and obtains the message body, receiver terminal number and sender terminal number, and converts the short message into an IM. The detailed operations are as follows:

Convert the text format of the message body into the UTF-8 format.

Delete the SP number from the receiver terminal number "333333123456" and obtain the user number "123456"; obtain the domain name "ims1.com" associated with the user number "123456" according to the association between the user number and the IMS domain configured in the IM-MGW or by searching other network entities where the association is stored; add the domain name "ims1.com" after the receiver terminal number to generate the SIPURI of the receiver terminal "123456@ims1.com". The IM-MGW may also obtain the SIPURI of the receiver terminal in the following mode: The IM-MGW or other network entities (for example, an independent ENUM server) may be configured with the binding relationship between the user number and the SIPURI, so that the IM-MGW may obtain the SIPURI "sip:123456@ims1.com" of the user number "12345" on the IMS network by searching for the binding relationship. If the SIPURI is obtained according to the binding relationship between the user number and the SIPURI, the user part of the SIPURI may be non-numerical.

The IM-MGW assembles the message content and address into an IM, and sends the IM to the home messaging AS of the receiver terminal.

Steps 512 and 513: The home messaging AS of the IMS receiver terminal sends the IM to the IMS network, and the IMS network sends the IM to the IMS terminal associated with the SIPURI of the receiver terminal.

FIG. 5B shows a process of receiving a short message from an IMS sender terminal by an IMS user terminal according to the SMS user number bound to the IMS user terminal and replying to the IMS user terminal. The process of receiving a multimedia message from an IMS sender terminal according to the MMS user number bound to the IMS user terminal and replying to the IMS user terminal is similar.

In the preceding process, because the IM-MGW is configured with the user information in all IMS domains, the IM-MGW may obtain the related IMS or SIPURI according to the user ID in the receiver terminal number after receiving the short message or multimedia message reply of the SMS user or MMS user. When the user information in any IMS domain is changed, the user data needs to be synchronized in the IM-MGW.

According to the networking structures in the third embodiment and the fourth embodiment, an IM gateway is configured to implement message conversion and forwarding and implement interworking between a short message (or multimedia message) and an IM. During the implementation, when the IMS user sends the IM to the SMS (or MMS) user terminal (by using the SMS or MMS user number), a short message (or multimedia message) type ID is added to the IM so that the IM can be routed to the IM gateway; an SP number of the IM gateway is added to the IM sender terminal number so that the short message (or multimedia message) can be routed to the IM gateway according to the SP number. Thus, the interworking between messages is implemented. When the IMS user of the receiver terminal is configured with a message forwarding policy and the sender terminal of the IM sends an IM to the IMS receiver terminal, the IM is sent to the IM gateway according to the message forwarding policy configured in the receiver terminal server, and the IM gateway converts the IM into a short message (or multimedia message). Thus, the interworking between messages is implemented.

In the processes of the third embodiment and the fourth embodiment, when the IM sent by the IMS user is converted into a short message or a multimedia message, the SP number may also not be added to the sender terminal number. In this case, the route information (pointing to the IM-MGW) associated with the IMS user ID needs to be configured in the SMS or MMS network (for example, the HLR), so that the SMS or MMS network can send the reply to the IM-MGW according to the route information stored in the network. Thus, the interworking between messages is implemented.

Embodiment 5:

This embodiment describes a process of converting an IM into a short message or a multimedia message and sending the short message or multimedia message to a receiver terminal by the home messaging AS corresponding to the IMS sender terminal of the IM.

Figure 6A:
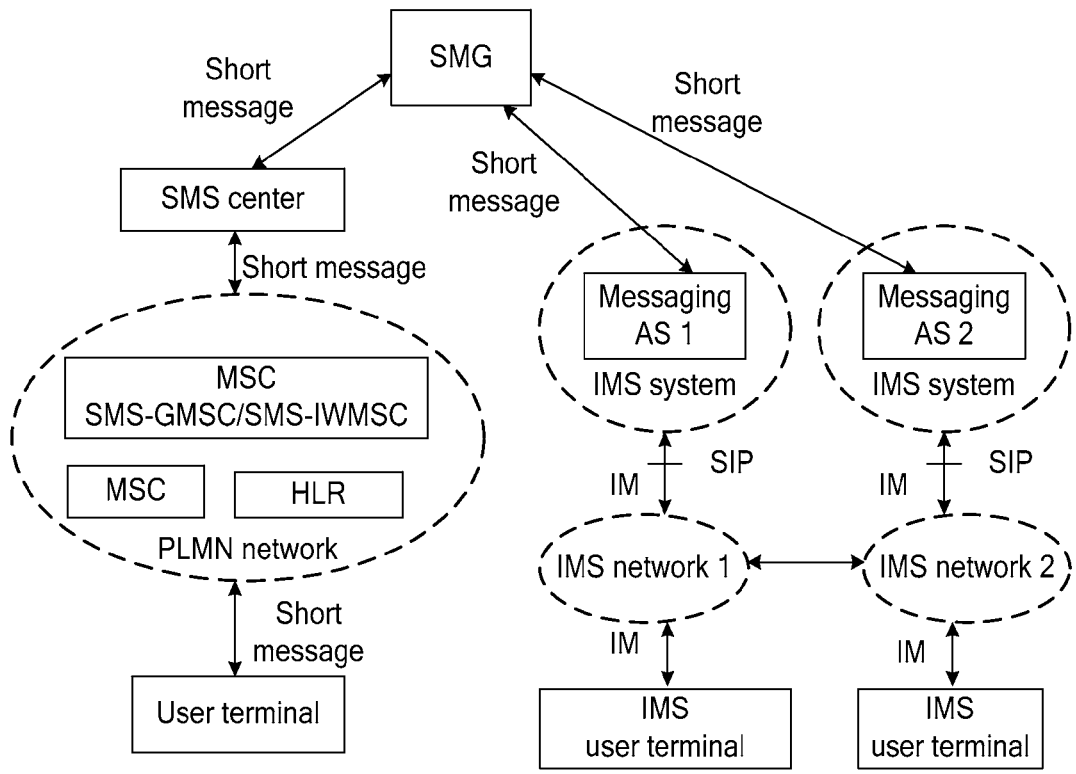
FIG. 6A and FIG. 6B show a networking structure of a fifth embodiment of the disclosure.

FIG. 6A shows a networking structure for interworking between an IM and a short message in the fifth embodiment. The networking structure may include multiple IMS networks, two of which are given in FIG. 6A. In the networking shown in FIG. 6A, the messaging AS on the IMS network interacts with the SMG on a PLMN network to implement interworking between an IM and a short message.

Figure 6B:
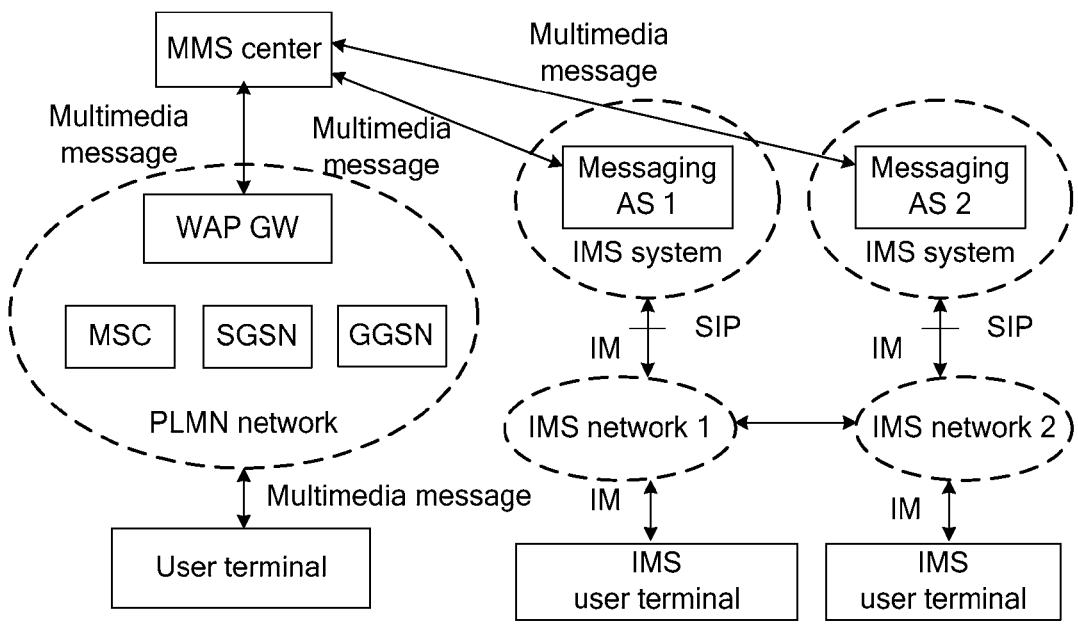

FIG. 6B shows a networking structure for interworking between an IM and a multimedia message in the fifth embodiment. The networking structure may include multiple IMS networks, two of which are given in FIG. 6B. In the networking shown in FIG. 6B, the messaging AS on the IMS network interacts with the SMS center on a PLMN network to implement interworking between an IM and a multimedia message.

Figure 7A:
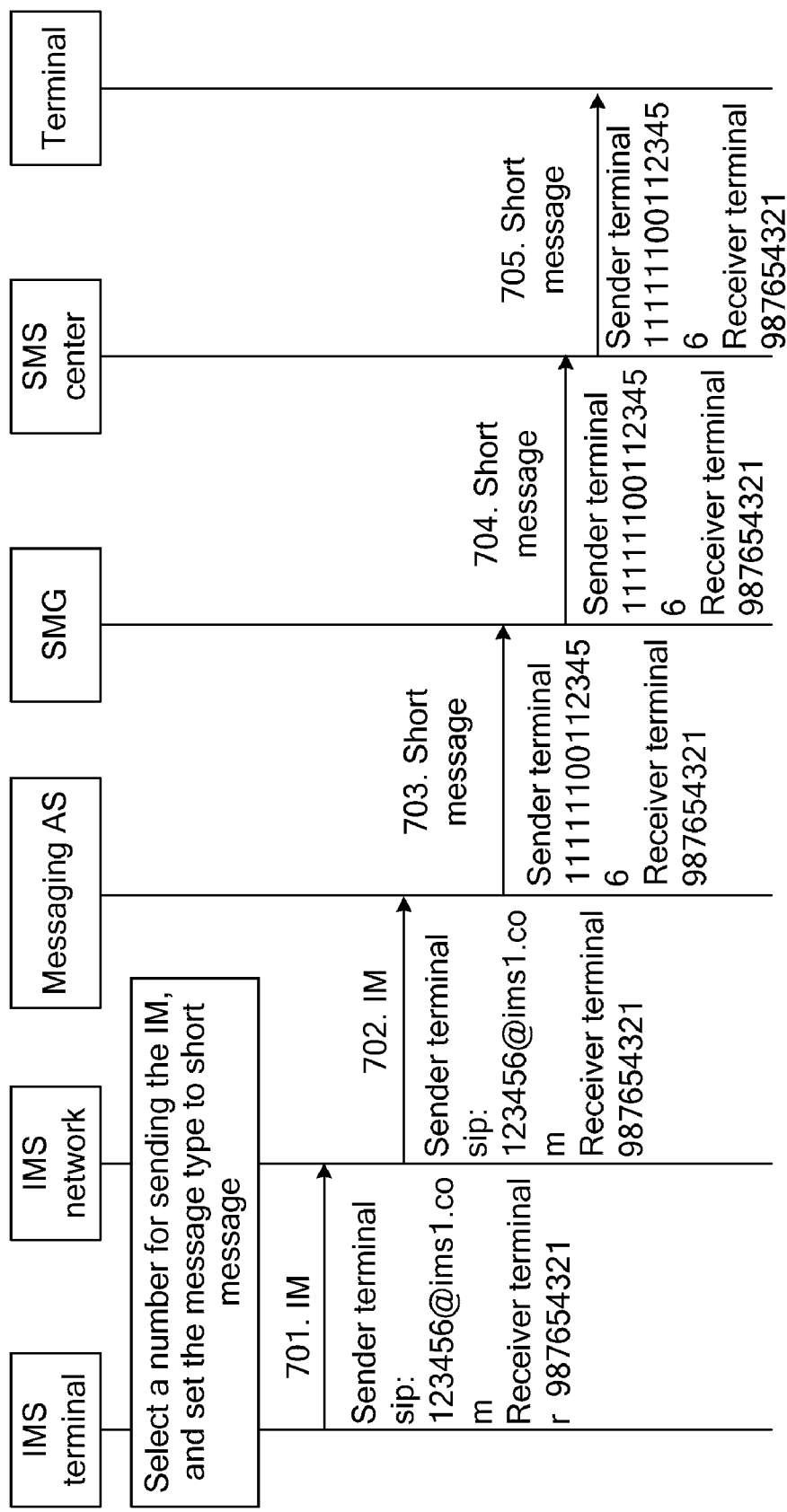
FIG. 7A and FIG. 7B show a process of interworking between a short message and an IM in the fifth embodiment of the disclosure.

FIG. 7A shows a process of sending an IM to an SMS user by an IMS user in the fifth embodiment of the disclosure. The process includes the following steps:

Step 701: The IMS user terminal sets the transmission of an IM, sets the message type to shot message, and sends the IM to the home IMS network of the terminal.

In this embodiment, the sender terminal uses "sip:123456@ims1.com" to log in to the IMS client, and sends an IM to a user with the number "987654321", with the message type set to short message.

Step 702: The home IMS network of the IMS terminal sends the IM to the home messaging AS of the IMS terminal.

Step 703: The home messaging AS of the IMS terminal converts the IM into a short message based on the fact that the IM message type is short message, and sends the short message to the SMG.

After receiving the IM, the home messaging AS of the IMS terminal performs the following operations based on the fact that the IM message type is short message:

Obtain the message text from the IM, and discard attachments (if the attachments are contained in the IM).

Split the sender terminal SIPURI of the IM into a user number and a domain name, and add the SP number of the messaging AS before the sender terminal number to generate an SMS sender terminal number; or search for the association between the SIPURI and the user number, and obtain the user number associated with the sender terminal SIPURI of the IM.

Assemble the obtained message content, sender terminal number and receiver terminal number into a short message based on the fact that the IM message type is short message, and send the short message to the SMG.

In this embodiment, the IM message type is short message; the SIPURI of the sender terminal is "sip:123456@ims1.com"; the receiver terminal number is "987654321"; the generated sender terminal number of the messaging AS is "111111123456" (where the first six-digit "111111" is the SP number of the messaging AS); and the obtained receiver terminal number is "987654321". The messaging AS encodes the message text into the short message format, sets the obtained receiver terminal number and sender terminal number to the receiver terminal number and sender terminal number of the short message, and assembles them into a short message. Then, the messaging AS obtains the IP address of the SMG according to its own configuration information, and sends the short message to the SMG.

Steps 704 and 705: The SMG forwards the short message to the SMS center, and the SMS center sends the short message to the SMS terminal associated with the receiver terminal number.

What has been described above is a process of sending an IM to an SMS user by an IMS user. The process of sending an IM to an MMS user by an IMS user is similar.

Figure 7B:
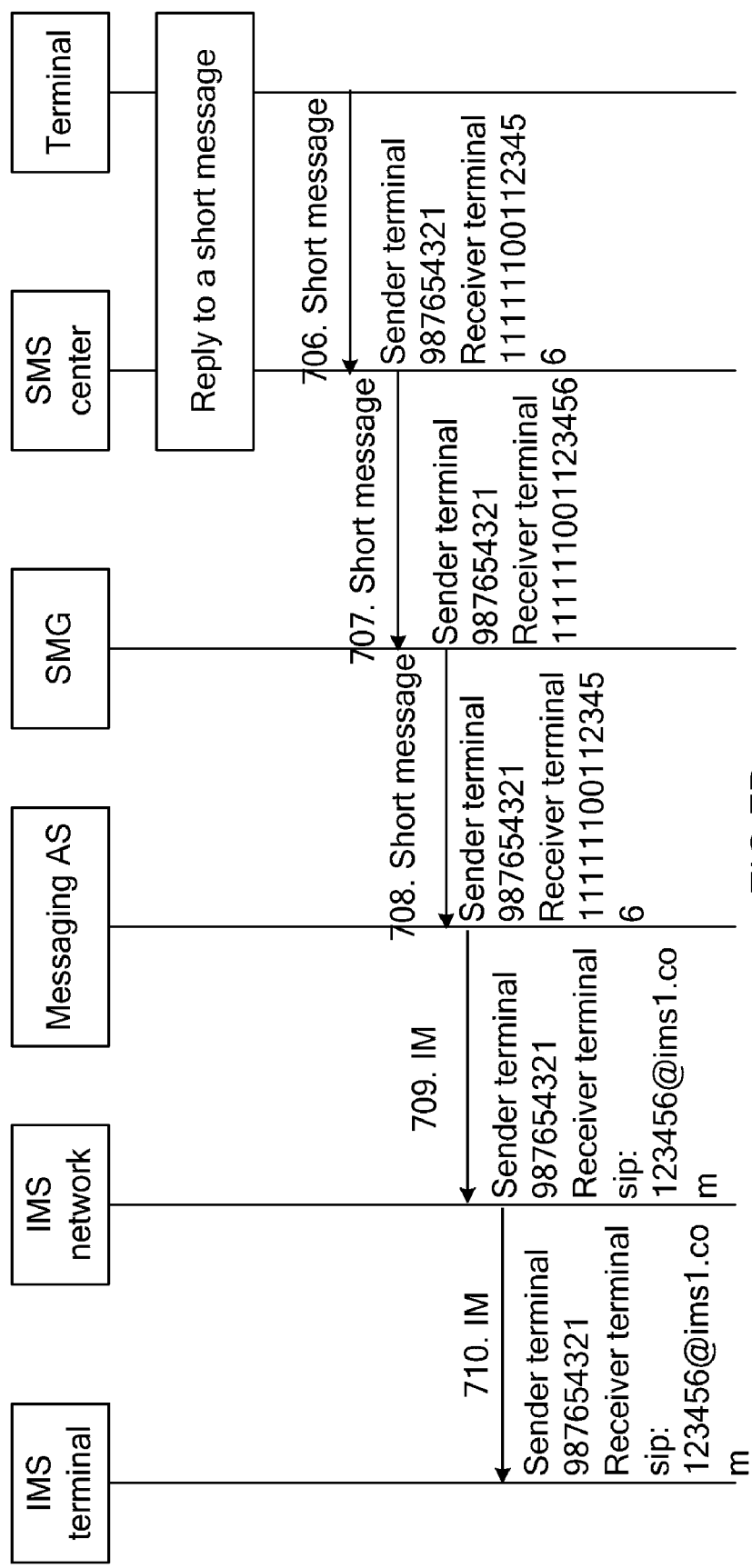

FIG. 7B shows a process of sending a short message to an IMS by an SMS in the fifth embodiment of the disclosure. The process includes the following steps:

Step 706: The SMS user terminal sends a short message to the SMS center, with the receiver terminal number of the short message carrying the SP number of the IM-MGW.

In this embodiment, an SMS user terminal with the number "987654321" receives a short message from a user with the number "111111001123456" (where the "111111" is the SP number of the IM-MGW), and replies to the user number.

Step 707: The SMS center determines that the receiver terminal of the message does not belong to the network according to the SP number in the receiver terminal number, and sends the short message to the SMG.

Step 708: The SMG sends the short message to the messaging AS according to the SP number in the receiver terminal number.

In this embodiment, the SP number of the messaging AS is associated with the address of the messaging AS, and the SMG is configured with the address information of the messaging AS. Thus, the SMG may send the short message to the messaging AS according to the SP number in the receiver terminal number.

Step 709: After receiving the short message, the messaging AS converts the short message into an IM, and sends the IM to the home IMS network of the IMS terminal.

In this embodiment, the SP number of the messaging AS that the messaging AS obtains from the receiver terminal number "111111123456" is "111111", and the user number is "123456". Then, the messaging AS combines the domain name and the user number parsed out into the SIPURI of the sender terminal 123456@imas1.com or obtains the SIPURI bound to the user number "12345" as the SIPURI of the sender terminal; the messaging AS converts the text format of the message body parsed out from the short message into the IM format; the messaging AS assembles the message body upon format conversion and obtained address information into an IM, and sends the IM to the IMS network.

Step 710: The IMS network sends the IM to the IMS terminal associated with the SIPURI of the receiver terminal.

What has been described above is a process of sending a short message to an IMS user by an SMS user. The process of sending a multimedia message to an IMS user by an MMS user is similar.

In this embodiment, the messaging AS may be configured with the user information in the local IMS domain.

Embodiment 6:

This embodiment describes a process of converting an IM into a short message or a multimedia message and sending the short message or multimedia message to the receiver terminal by the home messaging AS of the IMS sender terminal of the IM.

Table 1 shows the mapping between a domain name and an area code configured in the messaging AS in this embodiment.

TABLE 1

| Domain Name (Character String) | Area Code (Character String) | Sender Forwarding ID (Boolean) |
| --- | --- | --- |
| ims1.com | 001 | True |
| ims2.com | 002 | False |
| abc.ims1.com | 003 | True |
| ims1.com | 004 | False |
| ims3.com | 005 | False |
| ... | ... | ... |

The area code in table 1 is the unique ID for each record. It may be set to three digits in sequence. If the area code is shorter than three digits, zero is added to the left of the area code.

The initial data of the mapping between domain name and area code may be allocated statically, which may be determined by each messaging AS during the networking planning The incremental data of the mapping may be automatically allocated by each messaging AS according to the following principle:

When a record about the mapping between a new domain name or an old domain name and the area code is available but the sender terminal forwarding ID is inconsistent with that in the mapping table, the domain name is recorded into the mapping table and allocated a new area code (added in sequence, and a sender terminal forwarding ID value is set for the record.

The value of the sender terminal forwarding ID in the mapping table is Boolean. The ID value indicates whether the messaging AS that performs message conversion is the home messaging AS corresponding to the sender terminal of the IM during the process of sending an IM from the IMS domain to the SMS (MMS) domain. For example, when the value of the sender terminal forwarding ID is "True", the home messaging AS corresponding to the sender terminal of the IM converts the message format; when the value of the sender terminal forwarding ID is "False", the home messaging AS of the IMS receiver terminal (also the home messaging AS of the IMS terminal bound to the SMS or MMS user number) converts the message format.

When the messaging AS converts the IM into a short message or a multimedia message, the sender terminal number of the short message or multimedia message includes the SP number of the messaging AS, an area code associated with the sender terminal domain name, and a user number obtained from the SIPURI of the sender terminal. For the short message or multimedia message reply of the message receiver terminal, the messaging AS splits the receiver terminal number into the SP number of the messaging AS, area code, and user number, obtains the domain name of the receiver terminal by searching the mapping table between the domain name and the area code, and constructs the SIPURI of the receiver terminal by using the domain name and user number. In addition, the messaging AS obtains the sender terminal forwarding ID by searching the mapping table between the domain name and the area code, converts the short message or multimedia message into an IM by using the message conversion mode associated with the sender terminal forwarding ID, and sends the IM to the IMS user.

During the process of replying to the short message or multimedia message, the IMS messaging AS finds the sender terminal forwarding ID according to the area code in the receiver terminal number. If the sender terminal forwarding ID indicates that the short message or multimedia message receiver terminal (also the IM sender terminal) is a user in the local domain (the sender terminal forwarding ID is "True"), the receiver terminal of the IMS message converts the short message or multimedia message into an IM after receiving the short message or multimedia message, and sends the IM to the receiver terminal, with the message type identifying the type of SMS or MMS network from which the message comes.

If the sender terminal forwarding ID indicates that the short message or multimedia message receiver terminal is not a user in the local domain or may be a user in the local domain (the sender terminal forwarding ID is "False"), the IMS messaging AS converts the short message or multimedia message into an IM after receiving the short message or multimedia message, and forwards the IM to the IMS home messaging AS the receiver terminal (the functions of searching for the message and routing the message to the IMS home messaging AS corresponding to the receiver terminal are provided by the IMS Core. The two IMS messaging as may be the same. However, before the message is routed by the IMS Core, the messaging AS processes the sender terminal logic; after the message is routed by the IMS Core, the messaging AS processes the receiver terminal logic), and the message type ID is the short message.

This embodiment uses the networking structure shown in FIG. 6A and the mapping table between the domain name and the area code shown in Table 1. The process of interworking between a short message and an IM in this embodiment is similar to that shown in FIG. 7A and FIG. 7B.

In this embodiment, the differences between the process of sending an IM to an SMS user by an IMS user and that shown in FIG. 7A are as follows:

In step 703, after the home messaging AS of the IMS terminal receives the IM, the messaging AS performs the following operations based on the fact that the IM message type is short message:

Obtain the message text from the IM, and discard attachments (if the attachments are contained in the IM).

Split the sender terminal SIPURI of the IM into a user number and a domain name; search the mapping table between the domain name and the area code configured in the messaging AS for the area code associated with the domain name, and add the SP number of the messaging AS and obtained area code before the sender terminal number to generate a new sender terminal number. The new sender terminal number may further carry an anonymous ID, the value of which is Boolean. When the value of the anonymous ID is "0", it indicates a reply to a common message; when the value of the anonymous ID is "1", it indicates a reply to an anonymous message. The anonymous ID may be added between the area code and the user ID.

The messaging AS assembles the obtained message content, sender terminal number and receiver terminal number into a short message based on the fact that the IM message type is short message, and sends the short message to the SMG.

In this embodiment, the IM message type is short message; the SIPURI of the sender terminal is "sip:123456@ims1.com"; the receiver terminal number is "987654321"; and the area code associated with "ims1.com" and the sender terminal forwarding ID "True" is "001" (because the home messaging AS corresponding to the sender terminal converts the message, the sender terminal forwarding ID is "True"). Thus, the sender terminal number generated by the messaging AS is "111111001123456" (the first six digits indicate the SP number of the messaging AS, the next three digits indicate the area code of 001, and the remaining digits indicate the user number), and the obtained receiver terminal number is "987654321". The messaging AS encodes the message text format into the short message format, sets the obtained receiver terminal number and sender terminal number to the receiver terminal number and sender terminal number of the short message, and assembles them into a short message. Then, the messaging AS obtains the IP address of the SMG according to its own configuration information, and sends the short message to the SMG.

The process of sending an IM to an MMS user by an IMS user is similar.

The differences between the process of making a short message reply to the IMS user by the SMS user in this embodiment and the process shown in FIG. 7B are as follows:

In step 709, after receiving the short message, the messaging AS parses out an area code associated with the receiver terminal number from the short message, and searches the mapping table between the domain name and the area code for a sender terminal forwarding ID. Then, the messaging AS converts the short message into an IM according to the sender terminal forwarding ID, and sends the IM to the home IMS network of the IMS terminal.

In this embodiment, the SP number of the messaging AS, area code and user number that the messaging AS obtains from the receiver terminal number "111111001123456" are "111111", "001", and "123456" respectively. If finding that the sender terminal forwarding ID associated with the area code "001" in Table 1 is "True" (indicating that the receiver terminal and the messaging AS are in the same domain), the messaging AS converts the message format. The process includes the following:

Find that the domain name associated with the area code "001" is "ims1.com" in the mapping table, and combine the domain name and the user number into "123456@imas1.com", which is used as the SIPURI of the sender terminal; convert the text format of the message body parsed out from the short message into the IM message format; assemble the message body upon format conversion and obtained address information into an IM, and send the IM to the home IMS network of the messaging AS.

The process of sending an IM to an MMS user by an IMS user is similar.

Embodiment 7:

This embodiment describes a process of interworking between an IM and a short message or a multimedia message by the home IMS network of the IMS receiver terminal of the IM according to the forwarding policy set by the IMS receiver terminal of the IM.

FIG. 6A shows a networking structure for interworking between an IM and a short message in this embodiment. FIG. 6B shows a networking structure for interworking between an IM and a multimedia message in this embodiment. Table 1 shows the mapping between the domain name and the area code configured in each messaging AS.

Figure 8A:
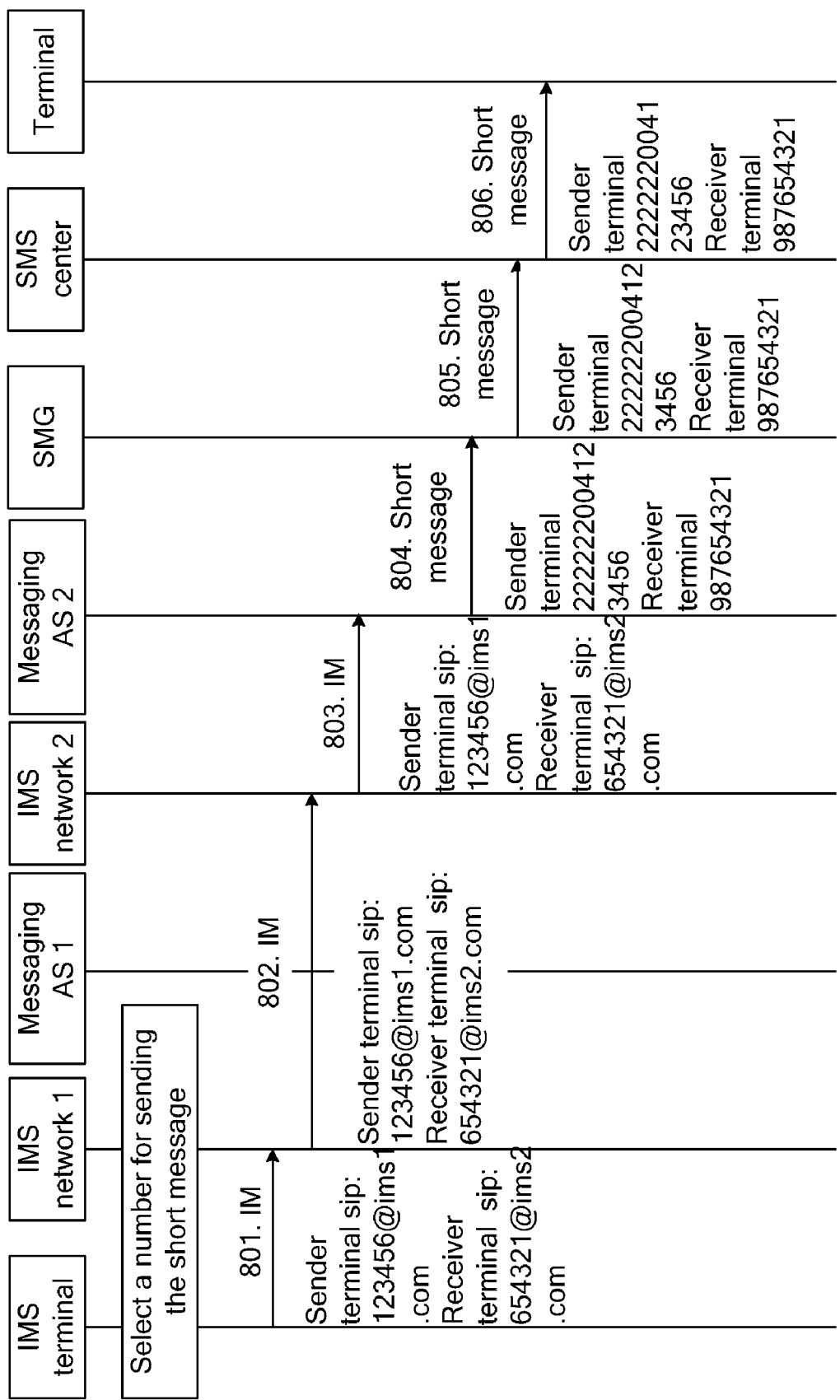
FIG. 8A and FIG. 8B show a process of interworking between a short message and an IM in a sixth embodiment of the disclosure.
Figure 8B:
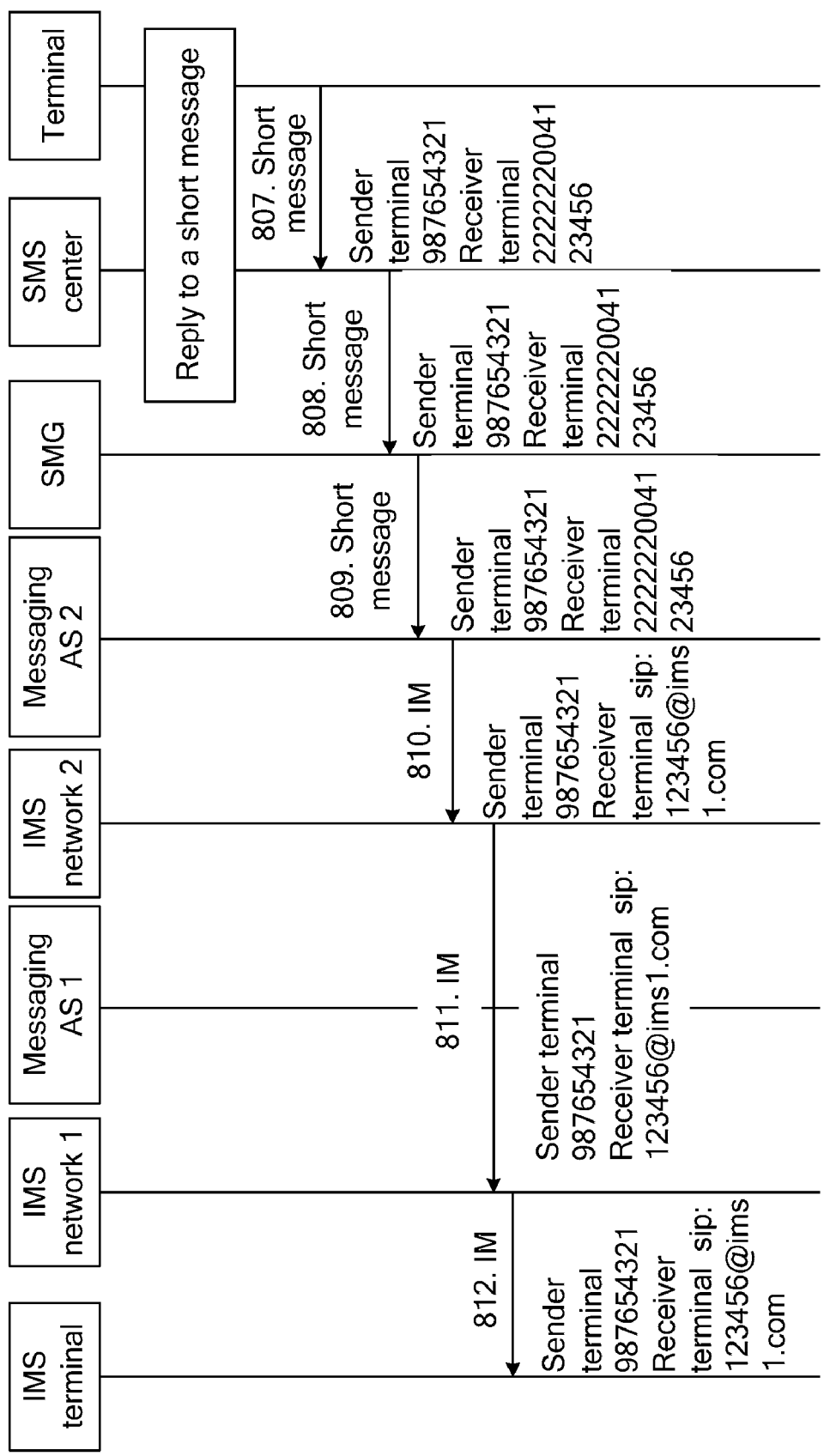

FIG. 8A and FIG. 8B show the processes of interworking between an IM and a short message according to the networking structure shown in FIG. 6A and the mapping between the domain name and the area code shown in Table 1.

FIG. 8A shows a process of sending an IM to an IMS sender terminal and sending an IM to an SMS user number bound to an IMS receiver terminal in the form of short message in the sixth embodiment of the disclosure. The IMS network 1 and the messaging AS 1 are the home IMS network and messaging AS of the IMS sender terminal. The IMS network 2 and the messaging AS 2 are the home IMS network and messaging AS of the IMS receiver terminal bound to the SMS user number. The messaging AS 2 is configured with the message forwarding policy and binding relationship between the SIPURI of the IMS receiver terminal and the SMS user number. The process of sending an IM to an IMS receiver terminal and sending an IM to an SMS user number bound to an IMS receiver terminal by an IMS sender terminal includes the following steps:

Step 801: The IMS sender terminal sets the transmission of an IM, and sends the IM to the home IMS network of the IMS terminal.

In this embodiment, an IMS user logs in to the IMS client by using "sip:123456@ims1.com", and sends the IM to an IMS receiver terminal with the SIPRUI "sip: 654321@ims2.com".

Step 802: The home IMS network of the IMS sender terminal sends the IM to the home IMS network of the IMS receiver terminal according to the SIPURI of the receiver terminal.

Step 803: The home IMS network of the IMS receiver terminal sends the IM to the home IMS network of the IMS receiver terminal.

Step 804: The home IMS network of the IMS receiver terminal converts the IM into a short message according to the configured message forwarding policy, and sends the short message to the SMG.

The home IMS network of the IMS receiver terminal is configured with a message forwarding policy set by the IMS receiver terminal. For example, the receiver terminal sets the forwarding policy as follows: When the IMS receiver terminal is online, the IM is sent to the IMS receiver terminal; when the IMS receiver terminal is offline and an offline policy is configured to forward the IM to the SMS user number bound to the IMS receiver terminal in the form of short message, the IM is converted into a short message and sent to the SMG. The forwarding policy set by the IMS receiver terminal may also be unconditional forwarding. In this case, the home IMS network of the IMS receiver terminal converts the IM into a short message and sends it to the SMG without judging whether the IMS receiver terminal is online.

The process of converting the IM into a short message by the messaging AS 2 according to the message forwarding policy and the binding relationship between the SIPURI of the IMS receiver terminal and the SMS user number includes the following steps:

Obtain the message text from the IM, and discard attachments (if the attachments are contained in the IM).

Obtain the user number "987654321" bound to the SIPURI of the receiver terminal "sip:654321@ims2.com" according to the binding relationship between the SIPURI of the IMS receiver terminal and the SMS user number; obtain the user number "123456" according to the SIPURI of the sender terminal, and find the area code "004" associated with the domain name "ims1.com" of the SIPURI of the sender terminal and the sender terminal forwarding ID "False" in Table 1 (because the receiver terminal specifies that the home message AS corresponding to the IMS receiver terminal converts the message according to the message forwarding policy set by the IMS receiver terminal, and the home message AS and the IM message sender terminal may not be in the same IMS domain, the sender terminal forwarding ID is "False"); add the SP number "222222" of the messaging AS 2 and the area code "004" associated with the domain name "ims1.com" before the sender terminal number in sequence to generate a new sender terminal number "222222004123456". The messaging AS 2 encodes the message text format into the short message format, sets the obtained receiver terminal number and sender terminal number to the receiver terminal number and sender terminal number of the short message, and assembles them into a short message. Then, the messaging AS 2 obtains the IP address of the SMG according to its own configuration information, and sends the short message to the SMG.

Steps 805 and 806: The SMG forwards the short message to the SMS center, and the SMS center sends the short message to the user terminal associated with the receiver terminal number.

What has been described above is a process of sending an IM to an IMS receiver terminal by an IMS sender terminal and sending an IM to an SMS user number bound to an IMS receiver terminal in the form of short message by the home IMS network of the IMS receiver terminal according to the forwarding policy. The process of sending an IM to an IMS receiver terminal by an IMS sender terminal and sending an IM to an MMS user number bound to an IMS receiver terminal in the form of multimedia message by the home IMS network of the IMS receiver terminal according to the forwarding policy is similar to this process.

FIG. 8B shows a process of making a short message reply to an IMS receiver terminal through an SMS user number bound to an IMS terminal and sending the short message reply to the receiver terminal in the form of IM in the sixth embodiment of the disclosure. The IMS network 1 and the messaging AS 1 are the home IMS network and messaging AS of the IMS receiver terminal. The IMS network 2 and the messaging AS 2 are the home IMS network and messaging AS of the IMS receiver terminal bound to the SMS user number in FIG. 8B. The messaging AS 2 is configured with the message forwarding policy set by the IMS sender terminal and the user number associated with the SIPURI of the terminal. The process of sending a short message to the IMS receiver terminal through the SMS user number bound to the IMS sender terminal and sending the short message to the IMS receiver terminal in the form of IM includes the following steps:

Step 807: Send the short message to the SMS center through the SMS user number bound to the IMS sender terminal, with receiver terminal number of the short message carrying the SP number of the home message AS corresponding to the IMS receiver terminal.

In the process of replying to the short message received from the IMS user terminal through the SMS user number bound to the IMS user terminal, the sender terminal number of the short message may be used as the receiver terminal number of the short message reply. In this embodiment, a user terminal with an SMS user number "987654321" receives a short message from a user terminal with a user number "222222004123456" (where "222222" is the SP number in the messaging AS 2), and makes a short message reply to the user number.

Step 808: The SMS center determines that the receiver terminal of the message does not belong to the network according to the SP number in the receiver terminal number of the short message, and sends the short message to the SMG.

Step 809: The SMG sends the short message to the messaging AS (messaging AS 2) according to the SP number in the receiver terminal number.

In this embodiment, the SP number of the messaging AS is associated with the address of the messaging AS, and the SMG is configured with the address information of the messaging AS. Thus, the SMG may send the short message to the messaging AS 2 according to the SP number "222222" in the receiver terminal number.

In step 810, after receiving the short message, the messaging AS parses out an area code associated with the receiver terminal number from the short message, and searches the mapping between the domain name and the area code for a sender terminal forwarding ID. Then, the messaging AS converts the short message into an IM according to the sender terminal forwarding ID, and sends the IM to the IMS network (IMS network 2) in the local domain.

In this embodiment, the SP number, area code and user number that the messaging AS obtains from the receiver terminal number "222222004123456" are "222222", "004", and "123456" respectively after receiving the short message. If the receiver terminal forwarding ID associated with the area code "004" in Table 1 is "False" (indicating that the receiver terminal and the messaging AS may not belong to a same IMS domain, so the messaging AS needs to forward the message to the home IMS domain of the receiver terminal after message conversion), the messaging AS 2 converts the message format. The operations include the following:

Find that the domain name associated with the area code "004" is "ims1.com" in Table 1, and combine the domain name and the receiver terminal number into "12345@imas1.com", which is used as the SIPURI of the receiver terminal; convert the text format of the message body parsed out from the short message into the IM message format; assemble the message body upon format conversion and address information into an IM, and send the IM to the home IMS network of the IMS sender terminal.

The process after the message is sent from the IMS network 2 to the messaging AS 2 is ignored.

Steps 811-812: The IMS network 2 sends the IM to the home IMS network 1 of the receiver terminal. The IMS network 1 sends the IM to the IMS terminal associated with the SIPURI of the receiver terminal. The process after the message is sent from the IMS network 1 to the messaging AS 1 is ignored.

What has been described above is a process of receiving a short message from an IMS user and making a short message reply to the IMS user through an SMS user number bound to the IMS user terminal. The process of receiving a multimedia message from an IMS user and making a multimedia message reply to the IMS user through an MMS user number bound to the IMS user terminal is similar.

In this embodiment, the messaging AS may be configured with the user information in the local IMS domain.

According to the fifth embodiment and the sixth embodiment, when a user has multiple domain name suffixes in multiple IMS domains or an IMS domain (for example, different domain name suffixes are allocated for different enterprise users in an IMS domain), the messaging AS in each IMS domain can implement interworking between an IM and a short message/multimedia message. This enhances the serviceability of the messaging AS, increases the message traffic and efficiency, improves the utilization of network resources, and facilitates the operation, deployment and accounting of the messaging AS. For users, their reply messages can always match original messages properly no matter whether they send short messages/multimedia messages directly through a number or forward messages as short messages/multimedia messages in the messaging AS corresponding to the receiver terminal. Thus, users can easily communicate through messages in chat mode, enjoying a better user experience. In addition, an anonymous message in an IMS domain may be combined with a short message and a multimedia message, which implements the anonymous function during the interworking between an IM and a short message/multimedia message.

The SP number in the preceding embodiments is used for the following purposes: When the SMS or MMS user terminal replies to the message of the IMS user terminal, the SMG or MMS center may route the message reply to a device (for example, the SMS proxy in the first and second embodiments, IM-MGW in the third and fourth embodiments, and messaging AS in the fifth and sixth embodiments) according to the SP number. That is, the SP number functions as a route ID. Thus, the route ID is not limited to the SP number in the preceding embodiments of the disclosure, and other IDs with the same function as the SP number may also be added to the user number.

An embodiment of the disclosure also provides related apparatuses for implementing the preceding interworking processes.

Figure 9A:
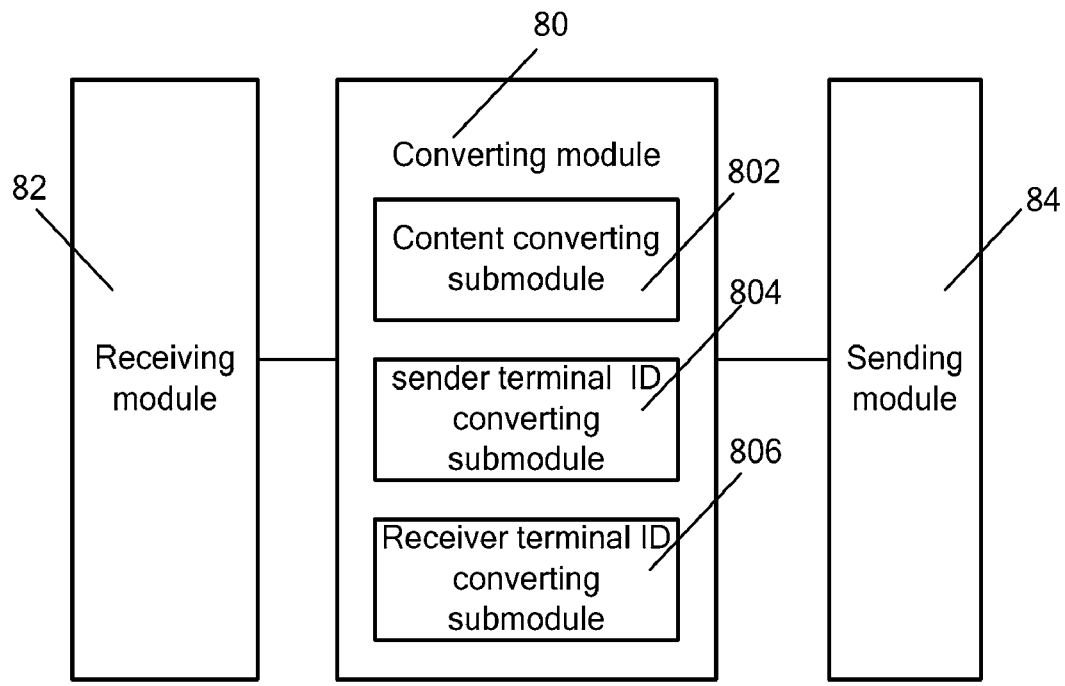
FIG. 9A and FIG. 9B show a structure of a message conversion apparatus provided in an embodiment of the disclosure.

A message conversion apparatus is provided for performing conversion between an IMS message and a non-IMS message. As shown in FIG. 9A, the message conversion apparatus may include a receiving module 82, a converting module 80, and a sending module 84. The receiving module 82 is adapted to receive an IMS message from an IMS network. The converting module 80 is adapted to convert the IMS message into a non-IMS message. The sending module 84 is adapted to send the non-IMS message to the home network of the non-IMS message, where the home network sends the non-IMS message to a receiver terminal of the non-IMS message.

If the IMS message received by the receiving module 82 carries a message type ID and the message type ID is a non-IMS message type ID (for example, a short message or multimedia message ID), the converting module 80 converts the IMS message into a non-IMS message associated with the message type ID; if the IMS message received by the receiving module 82 is associated with a message forwarding policy that converts the IMS message into a non-IMS message and sends the non-IMS message, the converting module 80 converts the IMS message into a non-IMS message according to the message forwarding policy.

In the message conversion apparatus shown in FIG. 9A, the converting module 80 includes a content converting submodule 802 and a sender terminal ID converting submodule 804, where the content converting submodule 802 is adapted to convert the format of an IMS message into the format of a non-IMS message, and the sender terminal ID converting submodule 804 is adapted to convert the sender terminal ID of an IMS message into a sender terminal ID of a non-IMS message.

The sender terminal ID converting submodule 804 may include a first converting unit or a second converting unit, where the first converting unit is adapted to: obtain a user ID from the sender terminal SIPURI of the IMS message, and add the user ID to the route ID (for example, an SP number)

that points to the message conversion apparatus to obtain the sender terminal ID of the non-IMS message; the second converting unit is adapted to: obtain a user ID bound to the SIPURI of the IMS sender terminal, and add the user ID to a route ID that points to the route ID (for example, an SP number) of the message conversion apparatus to obtain the sender terminal ID of the non-IMS message.

In the message conversion apparatus shown in FIG. 9A, the converting module 80 may further include a receiver terminal ID converting submodule 806. The receiver terminal ID converting submodule 806 is adapted to convert the receiver terminal ID of an IMS message into the receiver terminal ID of a non-IMS message. Specifically, it obtains a user ID bound to the receiver terminal SIPURI of the IMS message, where the user ID is set in the home network of the non-IMS message by the receiver terminal of the IMS message.

The message conversion apparatus shown in FIG. 9A may be an independent message conversion device, or be integrated with the home messaging AS corresponding to the sender terminal of the IMS message, or be integrated with the home messaging AS corresponding to the receiver terminal of the IMS message.

When the message conversion apparatus is integrated with the IMS messaging AS, the sender terminal ID converting submodule 804 in the message conversion apparatus is further adapted to add a record ID and a route ID to the sender terminal ID of the non-IMS message, where the route ID points to the messaging AS of the IMS network and the record ID is preset in the mapping between an IMS domain name and a sender terminal forwarding ID. The IMS domain name associated with the record ID is the home IMS domain name corresponding to the sender terminal of the IMS message. The sender terminal forwarding ID indicates whether the sender terminal of the IMS message and the messaging AS belong to the same IMS domain. If the IMS messaging AS integrated with the message conversion apparatus is the home messaging AS corresponding to the sender terminal, a record ID associated with a sender terminal forwarding ID indicating that the sender terminal of the IMS message and the messaging AS belong to the same IMS network is selected from the mapping table; if the IMS messaging AS integrated with the message conversion apparatus is the home messaging AS corresponding to the receiver terminal of the IMS message, a record ID associated with a sender terminal forwarding ID indicating that the sender terminal of the IMS message and the messaging AS do not belong to the same IMS network is selected from the mapping table. The sender terminal ID converting submodule is further adapted to add an anonymous ID to the sender terminal ID of the non-IMS message to indicate that the message is an anonymous message.

Figure 9B:
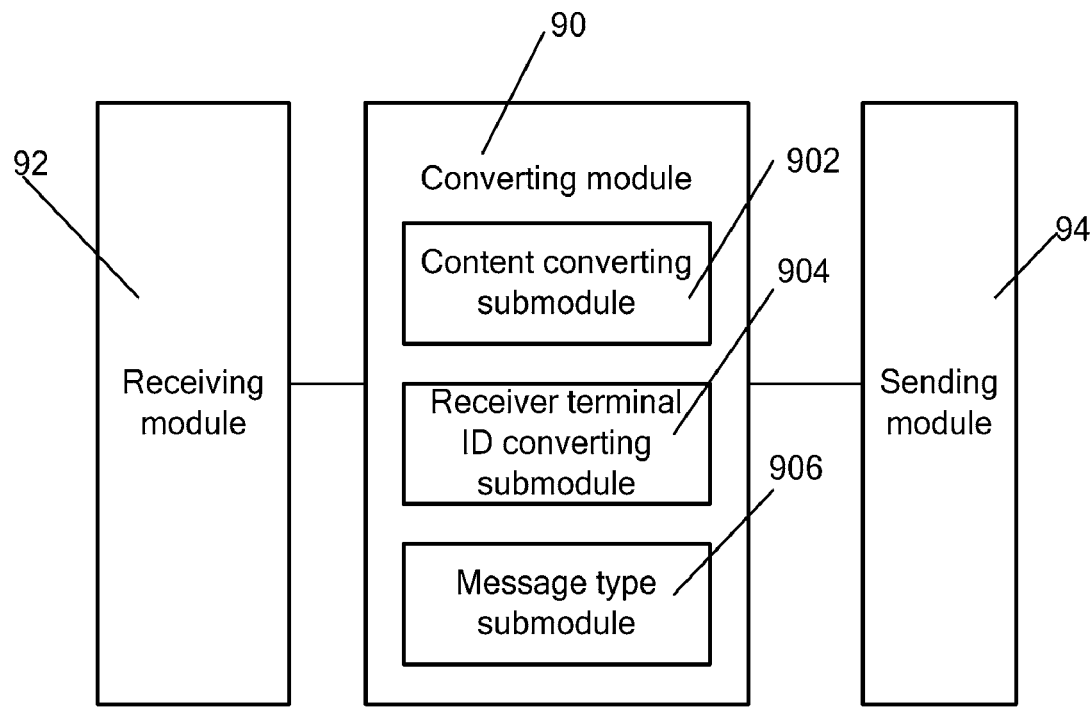

A message conversion apparatus is provided for performing conversion between an IMS message and a non-IMS message. As shown in FIG. 9B, the message conversion apparatus may include a receiving module 92, a converting module 90, and a sending module 94. The receiving module 94 is adapted to receive a non-IMS message from a non-IMS network. The converting module 90 is adapted to convert the non-IMS message into an IMS message. The sending module 94 is adapted to send the IMS message to an IMS network, where the IMS network sends the IMS message to a receiver terminal of the IMS message. The non-IMS message received by the receiving module 94 is sent to the receiving module 94 by the non-IMS network according to a route ID (pointing to the message conversion apparatus, for example, an SP number) carried in the non-IMS message or route information associated with the message conversion apparatus stored in the non-IMS network.

In the message conversion apparatus shown in FIG. 9B, the converting module 90 includes a content converting submodule 902 and a receiver terminal ID converting submodule 904, where the content converting submodule 902 is adapted to convert the format of a non-IMS message into the format of an IMS message, and the receiver terminal ID converting submodule 904 is adapted to convert the receiver terminal ID of a non-IMS message into the receiver terminal ID of an IMS message.

The receiver terminal ID converting submodule 904 includes a first converting unit or a second converting unit, where the first converting unit is adapted to: delete the route ID in the receiver terminal ID of the non-IMS message to obtain a user ID, and add the domain name of the home IMS network of the receiver terminal to the user ID to obtain the receiver terminal SIPURI of the IMS message; the second converting unit is adapted to: delete the route ID in the receiver terminal ID of the non-IMS message to obtain a user ID, and obtain the receiver terminal SIPURI of the IMS message according to the SIPURI bound to the user ID.

The converting module 90 in the message conversion apparatus shown in FIG. 9B further includes a message type submodule 906, adapted to add a message type ID to the IMS message, where the message type ID indicates the message type of a non-IMS message.

The message conversion apparatus shown in FIG. 9B may be an independent message conversion device, or be integrated with the home messaging AS corresponding to the sender terminal of the IMS message, or be integrated with the home messaging AS corresponding to the receiver terminal of the IMS message.

When the message conversion apparatus shown in FIG. 9A is integrated with the IMS messaging AS, the receiver terminal ID converting submodule 904 is further adapted to: search the mapping between a preset IMS domain name and a sender terminal forwarding ID for an IMS domain name associated with the record ID carried in the non-IMS message, and convert the receiver terminal ID of the non-IMS message into the sender terminal SIPURI of the IMS message according to the IMS domain name. The sending module 94 of the message conversion apparatus includes an obtaining submodule and a sending submodule, where:

the obtaining submodule is adapted to obtain the sender terminal forwarding ID from the mapping table; and the sending submodule is adapted to: send an IMS message to the receiver terminal of the IMS message when the sender terminal forwarding ID indicates that the messaging AS integrated with the message conversion apparatus and the receiver terminal of the IMS message belong to the same IMS network; and send an IMS message to the receiver terminal of the IMS message through the messaging AS associated with the IMS domain name when the sender terminal forwarding ID indicates that the messaging AS integrated with the message conversion apparatus and the IMS message receiver terminal do not belong to the same IMS network The preceding apparatus for conversion between an IMS message and a non-IMS message and the apparatus for conversion between a non-IMS message and an IMS message may be integrated into a same physical entity (for example, the IM-MGW or IMS messaging AS), so that bidirectional interworking between an IMS message and a non-IMS message is implemented.

In conclusion, embodiments of the disclosure provide several solutions for interworking between an IMS message and an IMS message, including interworking between an IMS message and a non-IMS message performed by the preset proxy and the IMS messaging AS, interworking between an IMS message and a non-IMS message performed by the preset MGW, and interworking between an IMS message and a non-IMS message performed by the messaging AS on an IMS network. These interworking modes can implement the process of sending a message and replying to a message to the non-IMS user terminal by the IMS user terminal and the process of sending a message and replying to a message to the user number (the user number of the IMS user terminal of the receiver terminal on a non-IMS network) bound to the IMS user terminal of the receiver terminal by the IMS user terminal.

It is understandable to those skilled in the art that the foregoing embodiments of the disclosure can be implemented by hardware or by software and a necessary general hardware platform. The technical solution of the disclosure may be represented by a software product which may be stored in a nonvolatile storage medium. The storage medium may be a compact disk read-only memory (CD-ROM), a USB disk, or a mobile hard disk. The software product includes a number of instructions that enable a computer device (personal computer, server, or network device), to execute the method provided in the embodiments of the invention.

Although the disclosure has been described through several exemplary embodiments, the invention is not limited to such embodiments. It is apparent that those skilled in the art can make various modifications and variations to the invention without departing from the spirit and scope of the invention. The disclosure is intended to cover such modifications and variations provided that they fall in the scope of protection defined by the following claims or their equivalents.

What is claimed is:

1. A method for transmitting messages between heterogeneous networks, comprising:
   receiving, by a home messaging application server (AS) corresponding to a sender terminal of an IP multimedia subsystem (IMS) message, the IP multimedia subsystem (IMS) message from an IMS network;
   sending, by the home messaging AS, the IMS message to a message gateway (IM-MGW);
   by the IM-MGW, parsing the IMS message, converting a content format of the IMS message into a content format of a non-IMS message, converting a sender terminal ID of the IMS message into a sender terminal ID of the non-IMS message; generating the non-IMS message according to the IMS message content, the sender terminal ID of the IMS message and a receiver terminal ID of the non-IMS message; and
   sending the non-IMS message to a receiver terminal of the non-IMS message through a home network of the non-IMS message.

2. The method of claim 1, further comprising converting a receiver terminal ID of the IMS message into the receiver terminal ID of the non-IMS message, wherein the step comprises:
   obtaining a user ID that is bound to a receiver terminal SIPURI address of the IMS message, wherein the user ID is set for the receiver terminal of the IMS message in the home network corresponding to the non-IMS message.

3. The method of claim 1, wherein converting the sender terminal ID of the IMS message into the sender terminal ID of the non-IMS message further comprises:
   adding an anonymous ID to the ID of the sender terminal of the non-IMS message.

4. A method for transmitting messages between heterogeneous networks, comprising:
   receiving, by a message gateway (IM-MGW), a non IP multimedia subsystem (IMS) message that a non-IMS message sender terminal of the non-IMS message sends through a non-IMS network according to a route ID of the IM-MGW carried in the non-IMS message;
   by the IM-MGW, parsing the non-IMS message, converting a content format of the non-IMS message into a content format of an IMS message, converting a receiver terminal ID of the non-IMS message into a receiver terminal ID of the IMS message; generating the IMS message according to the non-IMS message content, the receiver terminal ID of the IMS message and a sender terminal ID of the non-IMS message; and
   sending the IMS message to a receiver terminal of the IMS message through a home messaging application server (AS) corresponding to the receiver terminal of the IMS message.

5. The method of claim 4, wherein converting the receiver terminal ID of the non-IMS message into the receiver terminal ID of the IMS message comprises:
   deleting the route ID from the receiver terminal ID of the non-IMS message to obtain a user ID, and adding the user ID to the domain name of the home IMS network corresponding to the receiver terminal to obtain the receiver terminal address of the IMS message.

6. A message conversion apparatus, comprising:
   a receiving module, adapted to receive a non IP multimedia subsystem (IMS) message from a non-IMS network;
   a converting module, adapted to convert the non-IMS message into an IMS message; and
   a sending module, adapted to send the IMS message to an IMS network, wherein the IMS network sends the IMS message to a receiver terminal of the IMS message; wherein:
   the converting module comprises:
   a content converting submodule, adapted to convert a content format of the non-IMS message into a content format of the IMS message; and
   a receiver terminal ID converting submodule, adapted to convert a receiver terminal ID of the non-IMS message into receiver terminal ID of the IMS message; wherein the receiver terminal ID converting submodule is further adapted to query for an IMS domain name that is associated with a record ID carried in the non-IMS message in a mapping between a preset IMS domain name and a sender terminal forwarding ID, and convert the receiver terminal ID of the non-IMS message into a receiver terminal SIPURI address of the IMS message according to the IMS domain name;
   the sending module comprises:
   an obtaining submodule, adapted to obtain the sender terminal forwarding ID from the mapping according to the record ID; and
   a sending submodule, adapted to send the IMS message to the receiver terminal of the IMS message when the sender terminal forwarding ID indicates that a messaging application server (AS) integrated with the message conversion apparatus and the receiver terminal of the IMS message belong to a same IMS network; and send the IMS message to the receiver terminal of the IMS message through a messaging AS associated with the IMS domain name when the sender terminal forwarding ID indicates that the messaging AS integrated with the message conversion apparatus and the receiver terminal of the IMS message belong to different IMS networks.

7. The message conversion apparatus of claim 6, wherein the non-IMS message received by the receiving module is sent by the non-IMS network according to at least one of a route ID carried in the non-IMS message and route information associated with the message conversion apparatus that is stored in the non-IMS network.

8. A method for transmitting messages between heterogeneous networks, comprising:

receiving, by a home messaging application server (AS) corresponding to the sender terminal of an IP multimedia (IMS) message, the IMS message from an IMS network;

converting, by the home messaging AS corresponding to the sender terminal of the IMS message, the sender terminal ID of the IMS message into a sender terminal ID of the non-IMS message;

sending to a proxy, by the home messaging AS corresponding to the sender terminal of the IMS message, the IMS message content, the sender terminal ID of the non-IMS message and a receiver terminal ID; and by the proxy, generating the non-IMS message according to the IMS message content, the sender terminal ID of the non-IMS message and the receiver terminal ID, and sending the non-IMS message to a receiver terminal of the non-IMS message through the home network of the non-IMS message.

9. A method for transmitting messages between heterogeneous networks, comprising:

receiving, by a proxy, a non IP multimedia subsystem (IMS) message from a non-IMS message sender terminal from a non-IMS network, the non-IMS message comprising a route ID of a home messaging application server (AS);

sending, by the proxy, an obtained non-IMS message content, the sender terminal ID of the non-IMS message sender terminal and a receiver terminal ID of the non-IMS message, to the home messaging AS according to the route ID;

converting, by the home messaging AS, the receiver terminal ID of the non-IMS message into a receiver terminal ID of the IMS message and the non-IMS message content into a content format of an IMS message;

generating the IMS message according to the IMS message content, the sender terminal ID of the non-message sender terminal and the receiver terminal ID of the IMS message, and sending the IMS message to a receiver terminal of the IMS message through a home network of the IMS message.

* * * * *